(12) United States Patent
Okubo et al.

(10) Patent No.: US 10,644,638 B2
(45) Date of Patent: May 5, 2020

(54) ELECTRIC MOTOR SYSTEM

(71) Applicant: Hitachi Industrial Equipment Systems Co., Ltd., Chiyoda-ku, Tokyo (JP)

(72) Inventors: Tomofumi Okubo, Tokyo (JP); Toshio Tomita, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 16/089,136

(22) PCT Filed: Jan. 31, 2017

(86) PCT No.: PCT/JP2017/003432
§ 371 (c)(1),
(2) Date: Sep. 27, 2018

(87) PCT Pub. No.: WO2017/179269
PCT Pub. Date: Oct. 19, 2017

(65) Prior Publication Data
US 2019/0109557 A1   Apr. 11, 2019

(30) Foreign Application Priority Data
Apr. 13, 2016 (JP) ................. 2016-080215

(51) Int. Cl.
*H02P 1/46* (2006.01)
*H02P 29/024* (2016.01)
(Continued)

(52) U.S. Cl.
CPC ............ *H02P 29/024* (2013.01); *H02M 7/48* (2013.01); *H02P 6/16* (2013.01); *H02P 21/04* (2013.01);
(Continued)

(58) Field of Classification Search
CPC ........ H02P 27/06; H02P 27/14; H02P 25/024; H02P 6/12
See application file for complete search history.

(56) References Cited

U.S. PATENT DOCUMENTS

| 4,364,004 A * | 12/1982 | Bourbeau ............... H02P 25/03 318/721 |
| 2009/0146592 A1 | 6/2009 | Tobari et al. |
| 2012/0062157 A1 | 3/2012 | Ota et al. |

FOREIGN PATENT DOCUMENTS

| CN | 103133320 A | 6/2013 |
| CN | 103475296 A | 12/2013 |

(Continued)

OTHER PUBLICATIONS

International Search Report (PCT/ISA/210) issued in PCT Application No. PCT/JP2017/003432 dated Apr. 25, 2017 with English translation (four (4) pages).

(Continued)

*Primary Examiner* — Karen Masih
(74) *Attorney, Agent, or Firm* — Crowell & Moring LLP

(57) ABSTRACT

The purpose of the present invention is to provide an electric motor system such that loss of synchronism of an inverter-driven synchronous motor with no magnetic pole position sensor can be easily detected. In order to achieve the purpose, the present invention pertains to an electric motor equipped with a synchronous motor, an inverter having a power conversion device for driving the synchronous motor, and a load connected to the synchronous motor, and is configured such that loss of synchronism of the synchronous motor is determined on the basis of a direct-current voltage in the power conversion device.

9 Claims, 19 Drawing Sheets

(51) Int. Cl.
    *H02M 7/48*         (2007.01)
    *H02P 21/18*        (2016.01)
    *H02P 25/024*      (2016.01)
    *H02P 25/064*      (2016.01)
    *H02P 6/16*         (2016.01)
    *H02P 21/04*        (2006.01)
    *H02P 27/06*        (2006.01)

(52) U.S. Cl.
    CPC ............ *H02P 21/18* (2016.02); *H02P 25/024* (2016.02); *H02P 25/064* (2016.02); *H02P 27/06* (2013.01); *H02P 29/0241* (2016.02)

(56) References Cited

FOREIGN PATENT DOCUMENTS

| | | |
|---|---|---|
| JP | 4-17598 A | 1/1992 |
| JP | 2000-278985 A | 10/2000 |
| JP | 2006-87154 A | 3/2006 |
| JP | 2008-92787 A | 4/2008 |
| JP | 2010-259184 A | 11/2010 |
| JP | 2012-60781 A | 3/2012 |
| JP | 2015-133792 A | 7/2015 |
| JP | 2016-46875 A | 4/2016 |
| WO | WO 2015/097734 A1 | 7/2015 |

OTHER PUBLICATIONS

Japanese-language Written Opinion (PCT/ISA/237) issued in PCT Application No. PCT/JP2017/003432 dated Apr. 25, 2017 (four (4) pages).

Extended European Search Report issued in counterpart European Application No. 17782088.3 dated Nov. 13, 2019 (eight (8) pages).

* cited by examiner

FIG. 3A

CONTENTS OF VOLATILE MEMORY

| NO. | CODE | RECORDED VALUE | CONTENTS |
|---|---|---|---|
| 1000 | HzN | 60.0 | ROTATIONAL SPEED WHEN STARTING DETERMINATION (COMMAND FREQUENCY TO ELECTRIC MOTOR) |
| 1001 | VN | 282.0 | DC VOLTAGE IN POWER CONVERSION DEVICE WHEN STARTING DETERMINATION |
| 1002 | AN | 19.9 | LOAD CURRENT VALUE WHEN STARTING DETERMINATION |
| 1003 | TN1 | 25.0 | REMAINING TIME OF TIMER 1 |
| 1004 | TN2 | 55.0 | REMAINING TIME OF TIMER 2 |
| 1005 | CN | 3 | CURRENT SYNCHRONIZATION LOSS DETECTION NUMBER OF TIMES |
| 1006 | VDG | 10.5 | DETERMINATION REFERENCE VALUE OF DC VOLTAGE CHANGE |
| 1007 | HDL | 50.0 | ROTATIONAL SPEED DURING DECELERATION |

FIG. 3B

CONTENTS OF NON-VOLATILE MEMORY

| NO. | CODE | RECORDED VALUE | CONTENTS |
|---|---|---|---|
| 2000 | HzDG | 3.0 | DETERMINATION VALUE OF DETERMINATION EXECUTION (ROTATIONAL SPEED SUBTRACTION DETERMINATION REFERENCE VALUE) |
| 2001 | HDQ | 3.0 | ROTATIONAL SPEED SUBTRACTION AMOUNT DURING DETERMINATION |
| 2002 | HDS | 6.0 | ROTATIONAL SPEED SUBTRACTION SPEED DURING DETERMINATION |
| 2003 | HAQ | 3.0 | ROTATIONAL SPEED ADDITION AMOUNT DURING DETERMINATION |
| 2004 | HAS | 6.0 | ROTATIONAL SPEED ADDITION SPEED DURING DETERMINATION |
| 2005 | ADQ | 0.5 | ERROR TOLERANCE OF LOAD CURRENT VALUE |
| 2006 | ADG1 | 25.0 | DETERMINATION REFERENCE VALUE 1 OF LOAD CURRENT VALUE CHANGE |
| 2007 | ADG2 | 35.0 | DETERMINATION REFERENCE VALUE 2 OF LOAD CURRENT VALUE CHANGE |
| 2008 | TM1 | 30.0 | TIMER 1 SET VALUE (CYCLE OF SYNCHRONIZATION LOSS DETERMINATION) |
| 2009 | TM2 | 60.0 | TIMER 2 SET VALUE (FOR CONFIRMATION OF SYNCHRONIZATION LOSS FREQUENCY) |
| 2010 | SLD | 0 | SELECTION OF SYNCHRONIZATION LOSS DETERMINATION FUNCTION (0: NO, 1: YES) |
| 2011 | DCS | 1 | METHOD OF SETTING DETERMINATION REFERENCE VALUE (1: MANUAL SETTING, 2: DATA TABLE SETTING, 3: AUTOMATIC SETTING) |
| 2012 | HzC | 35.0 | THE SAME FREQUENCY OF LOAD CURRENT IN NORMAL STATE AND CURRENT IN SYNCHRONIZATION LOSS STATE (CORRESPONDING TO N3 IN FIG. 17, N6 IN FIG. 18, AND N9 IN FIG. 19) |
| 3001 | MTT | 10.5 | MANUAL SET VALUE OF SYNCHRONIZATION LOSS DETERMINATION VALUE |
| 4001 | RDM | 2 | LOAD TYPE (1: PUMP, 2: FAN, ...) |
| 4002 | KW | 11.0 | CAPACITY OF ELECTRIC MOTOR (kW) |
| 4003 | VLT | 200.0 | RATED OUTPUT VOLTAGE (V) OF ELECTRIC MOTOR |
| 4004 | KW | 46.0 | RATED CURRENT VALUE (A) OF ELECTRIC MOTOR |
| 5001 | RD1 | 10.0 | DETERMINATION CONSTANT CORRESPONDING TO LOAD TYPE 1 |
| 5002 | RD2 | 14.0 | DETERMINATION CONSTANT CORRESPONDING TO LOAD TYPE 2 |
| 5003 | RD3 | 21.0 | DETERMINATION CONSTANT CORRESPONDING TO LOAD TYPE 3 |
| ... | ... | ... | ... |
| 500N | RDN | 56.0 | DETERMINATION CONSTANT CORRESPONDING TO LOAD TYPE N |
| 6000 | ATT | 11.2 | AUTOMATIC SETTING RESULT OF SYNCHRONIZATION LOSS DETERMINATION VALUE |
| 7001 | SLA | 1 | OUTPUT PRESENCE/ABSENCE SELECTION OF FAULT SIGNAL (0: WITHOUT SIGNAL OUTPUT, 1: WITH SIGNAL OUTPUT) |
| 7002 | ALE | 5 | SYNCHRONIZATION LOSS DETECTION NUMBER OF TIMES FOR STARTING OUTPUT OF FAULT SIGNAL |
| 8001 | SLR | 1 | PERMISSION SELECTION OF AUTOMATIC RESTART (0: NO PERMISSION OF RESTART, 1: PERMISSION OF RESTART) |
| 8002 | RSE | 10 | PERMISSIBLE UPPER LIMIT NUMBER OF TIMES OF AUTOMATIC RESTART |
| 9001 | HS | 45.0 | WATER SUPPLY TARGET PRESSURE |

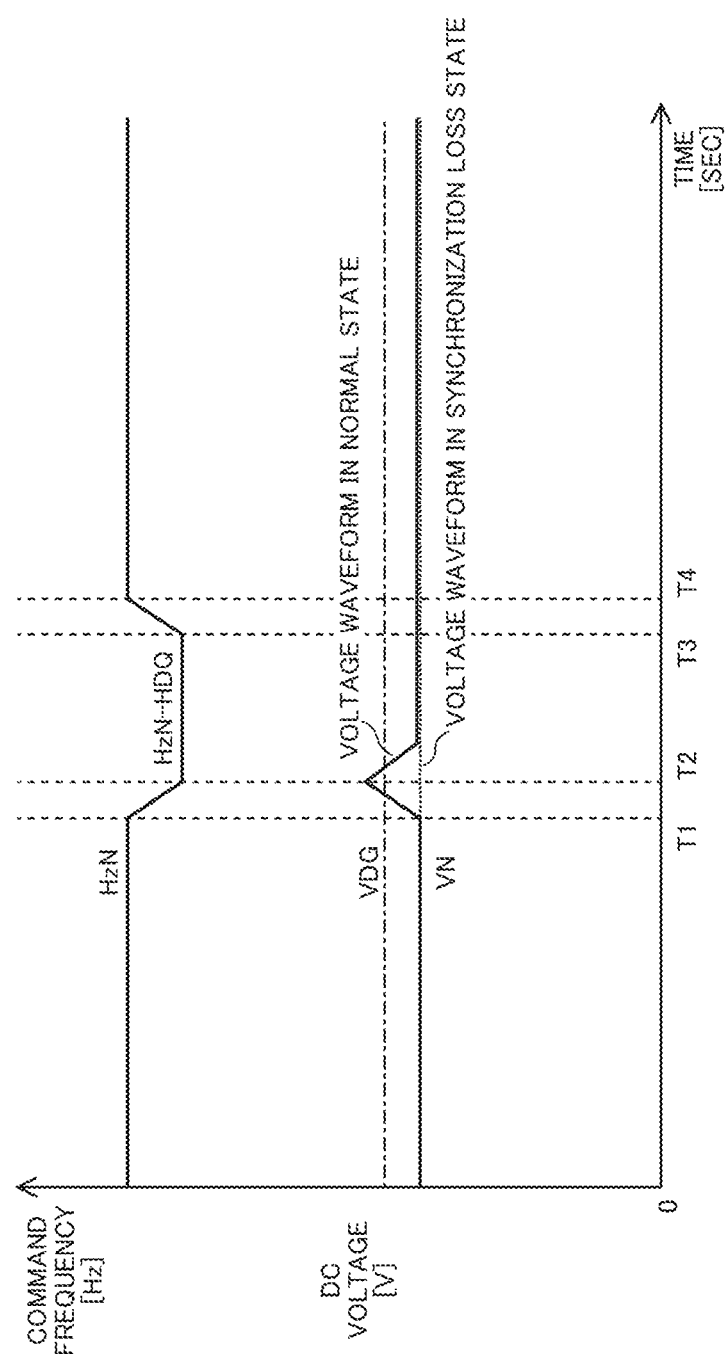

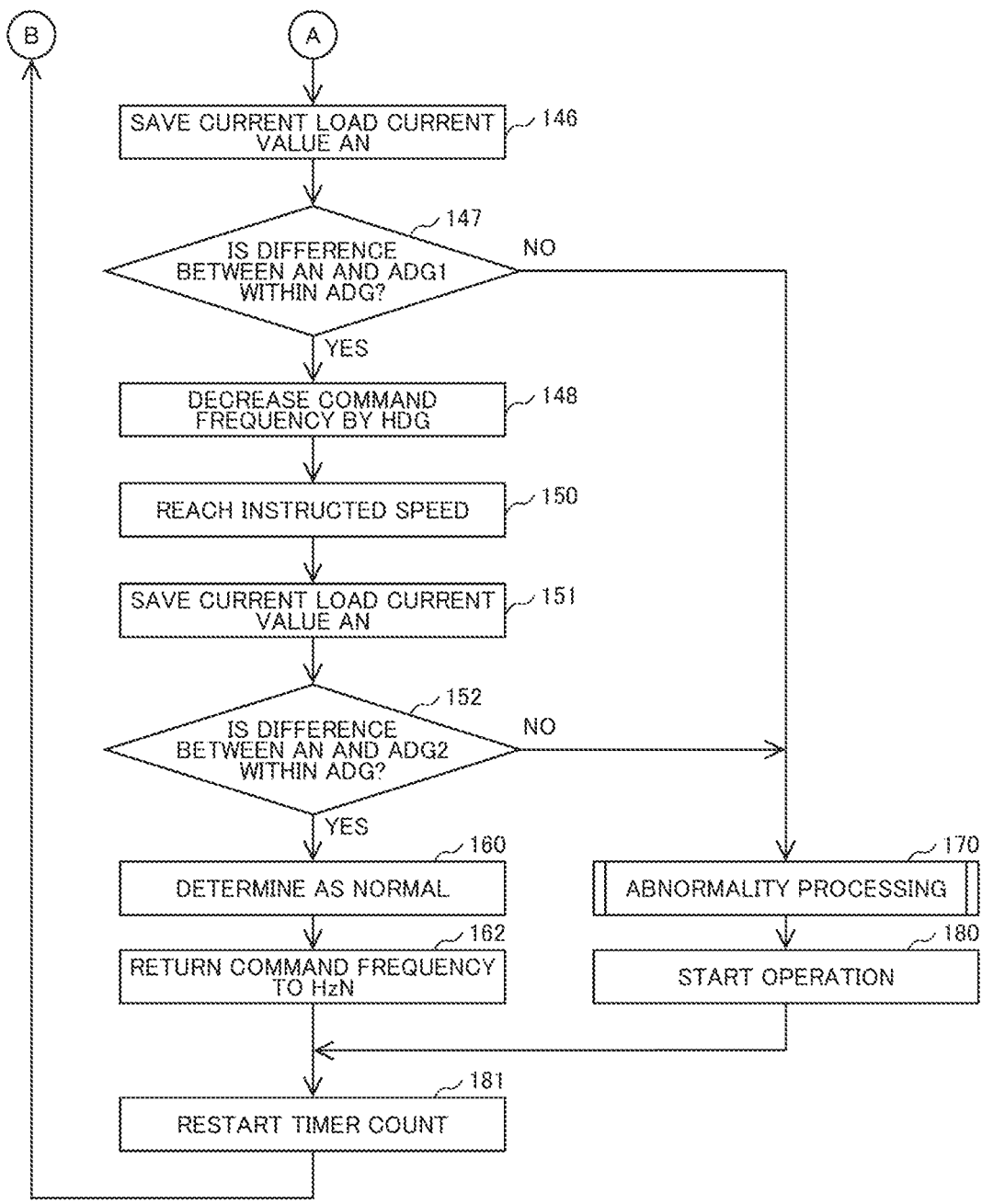
F I G. 1 2 B

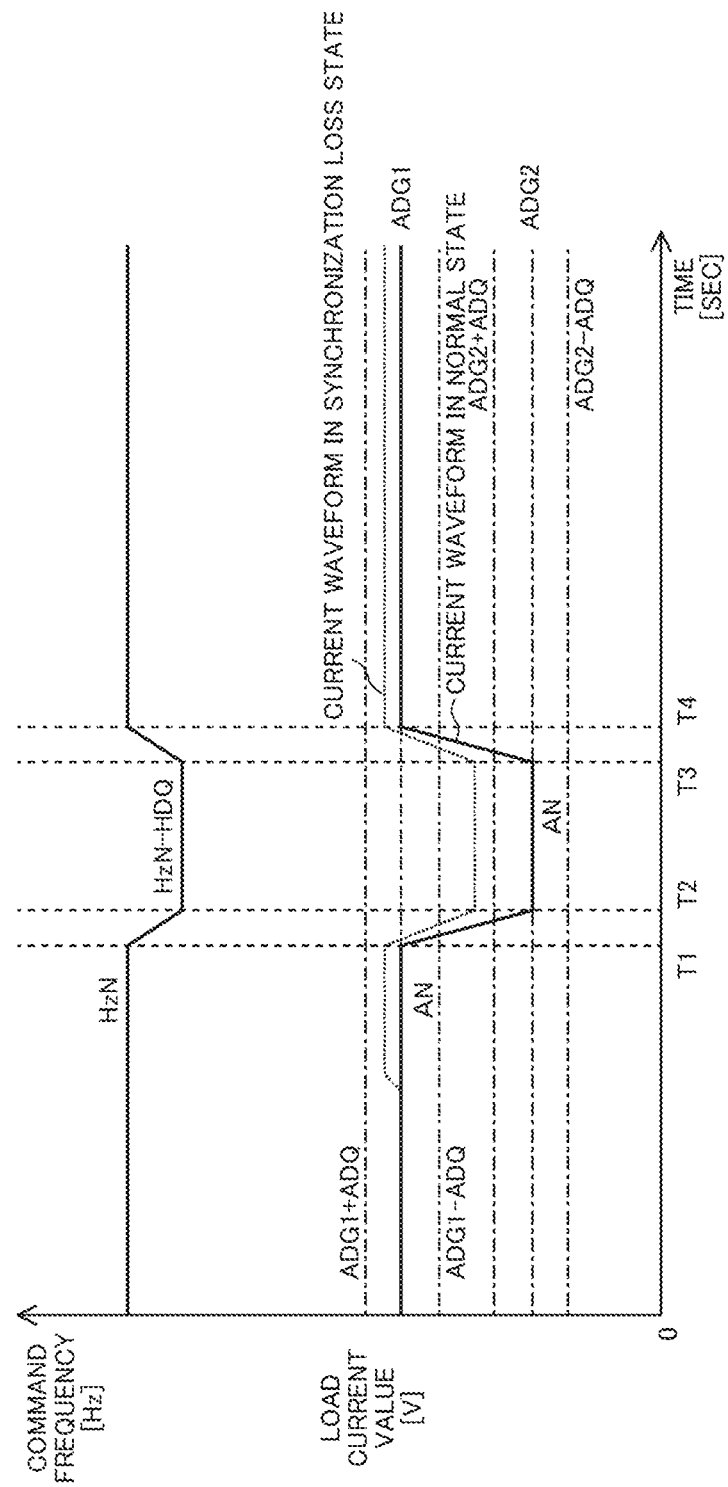
F I G. 13

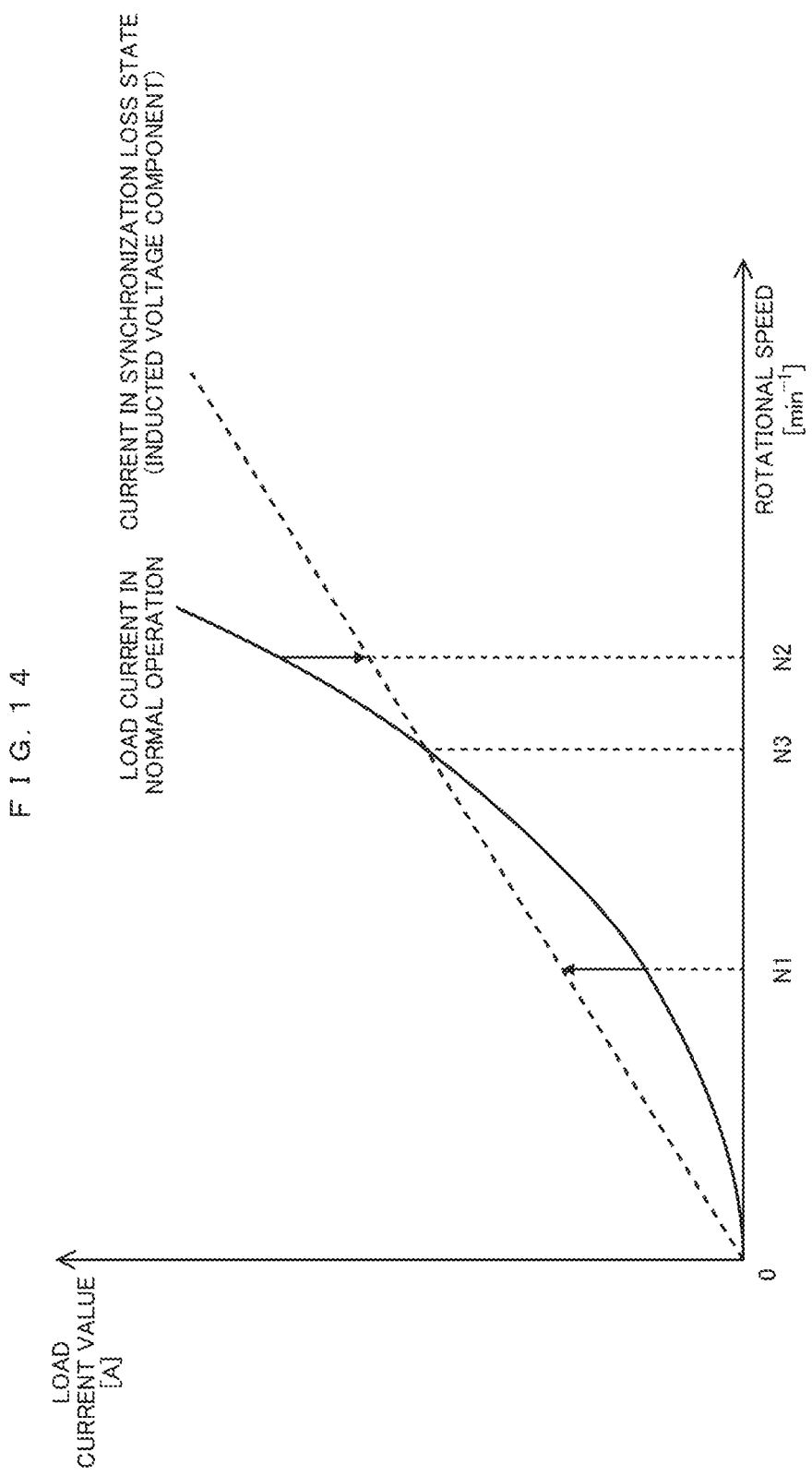
F I G. 1 4

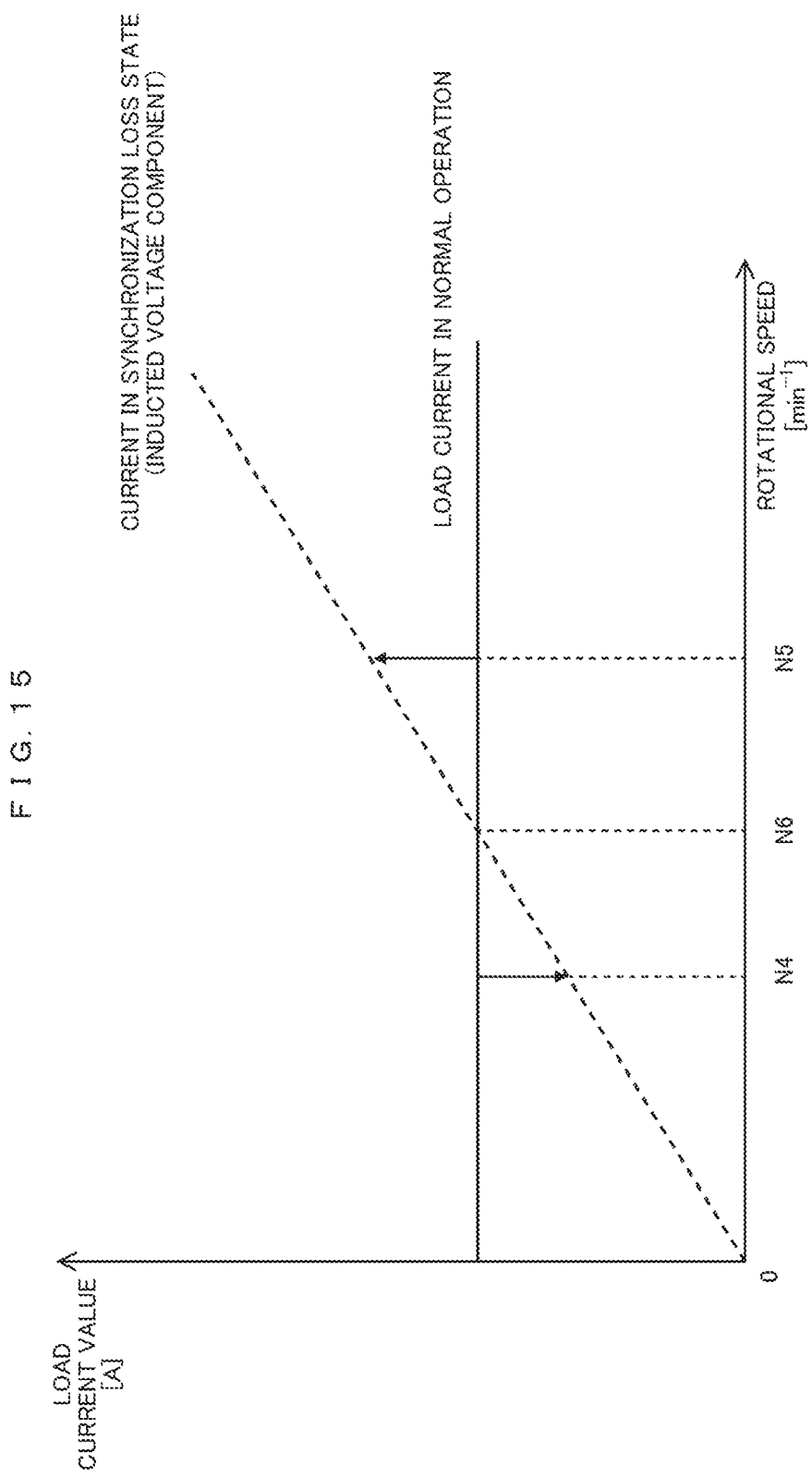
F I G. 15

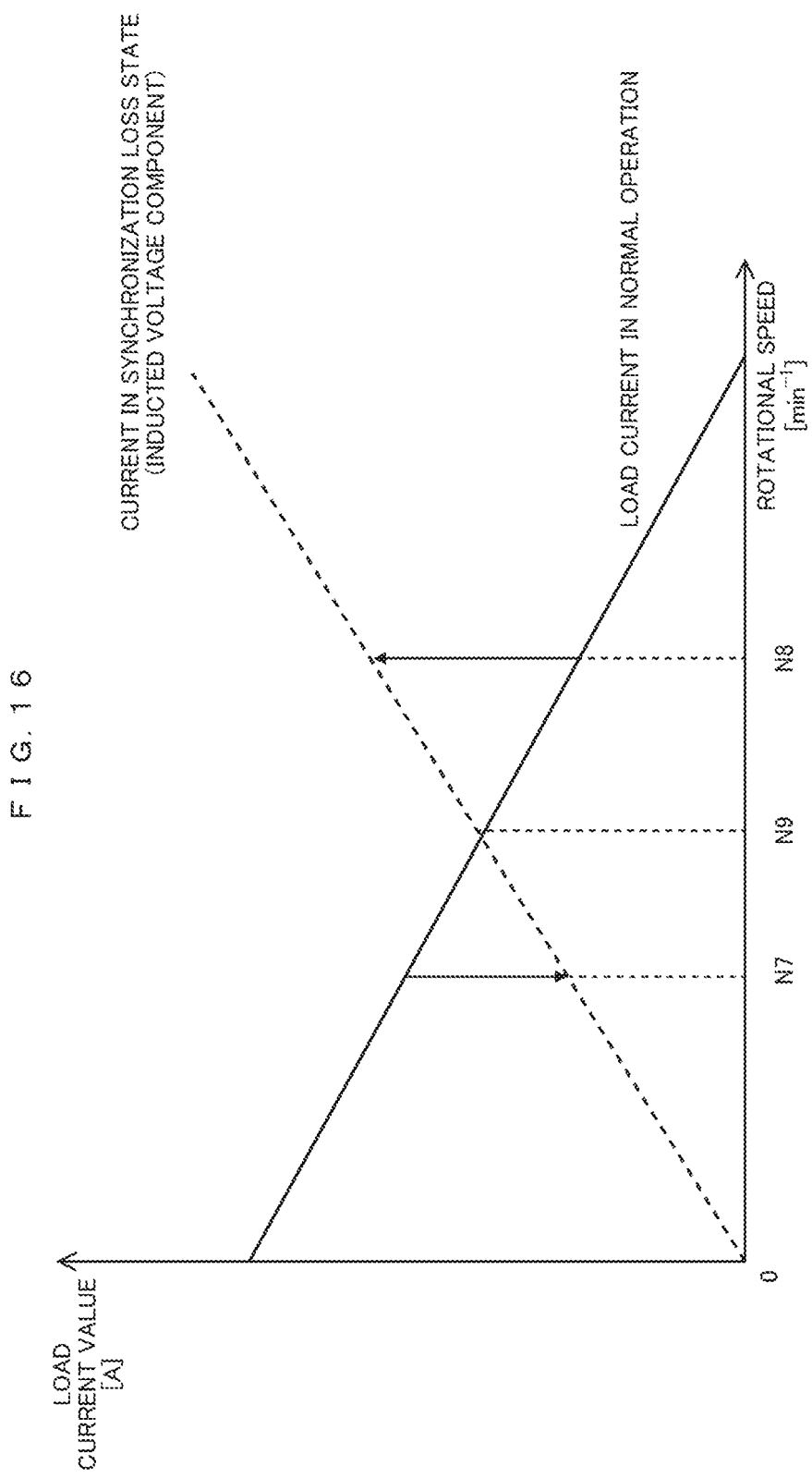
F I G. 16

ELECTRIC MOTOR SYSTEM

TECHNICAL FIELD

The present invention relates to a method of controlling an inverter for controlling a synchronous electric motor including a PM (permanent magnet) motor, and an electric motor system.

BACKGROUND ART

Up to now, induction motors have been mainly used as a drive source of mechanical devices, but at the present time, synchronous electric motors using permanent magnets are being adopted from the viewpoint of energy saving and high efficiency. In the case of the synchronous electric motors, an electric motor that does not have a magnetic pole position sensor has advantages that there is no risk of failure of a magnetic pole position sensor and the cost can be reduced.

On the other hand, in the case of a synchronous electric motor (hereinafter abbreviated as an electric motor) without any magnetic pole position sensor, a phenomenon called a synchronization loss phenomenon in which a rotational speed recognized by an inverter which controls the electric motor does not match a rotational speed of an actual electric motor shaft occurs, resulting in a possibility that the electric motor shaft does not rotate and the electric motor does not work.

For example, according to Japanese Unexamined Patent Application Publication No. 2012-60781 (PTL 1), abnormality of a rotation state of the electric motor can be detected by estimation calculation of an axis error of the electric motor.

CITATION LIST

Patent Literature

PTL 1: Japanese Unexamined Patent Application Publication No. 2012-60781

SUMMARY OF INVENTION

Technical Problem

Solution to Problem

However, even in a state of loss of synchronization, a current comparable to an induced voltage flows in the electric motor, and a current value of the current may not be distinguishable from a current value in a normal rotation state in some cases. For that reason, in a method of estimating the axis error according to a voltage command value and a current detection value disclosed in Patent Literature 1, the loss of synchronization cannot be always detected with precision in some cases.

Therefore, it is an object of the present invention to facilitate detection of the loss of synchronization by leveraging a characteristic of an application load and restart an electric motor as occasion demands to stably drive the load.

Solution of Problem

In order to solve the above problem, as an example, the present invention provides an electric motor system including a synchronous electric motor, an inverter having a power conversion device which drives the synchronous electric motor, and a load that is connected to the synchronous electric motor, in which a loss of synchronization of the synchronous electric motor is determined based on a DC voltage in the power conversion device.

Advantageous Effects of Invention

According to the present invention, an electric motor system capable of facilitating the detection of a loss of synchronization can be provided.

BRIEF DESCRIPTION OF DRAWINGS

FIGS. 3A and 3B are tables of the contents of a volatile memory and the contents of a nonvolatile memory stored in a storage unit according to the example 1.

FIG. 11 is an illustrative view of a change in DC voltage to a change in rotational speed in the example 3.

FIG. 12B is a flowchart of a second half of the control flow in the constant speed operation of the pump according to the example 4.

FIG. 13 is an illustrative view of a change in load current to a change in rotational speed in the example 4.

FIG. 14 is an illustrative view of a relationship between a load current and a current during a loss of synchronization in a square reduction load according to the example 4 and an example 5.

FIG. 15 is an illustrative view of a relationship between a load current and a current during the loss of synchronization in a constant torque load according to the example 5.

FIG. 16 is an illustrative view of a relationship between a load current and a current during the loss of synchronization in a constant output load according to the example 5.

Hereinafter, examples of the present invention will be described with reference to the drawings.

EXAMPLE 1

In the present example, in a synchronous electric motor while a load is being driven, a loss of synchronism is detected by a change in DC voltage in a power conversion device when a rotational speed of the electric motor is lowered. If the change in the rotational speed is equal to or more than a predetermined value, the change in DC voltage in the power conversion device is confirmed. If the amount of change does not exceed the predetermined value, it is determined that the synchronous electric motor is out of synchronization, and the electric motor is restarted to again start normal operation.

Figure 1:
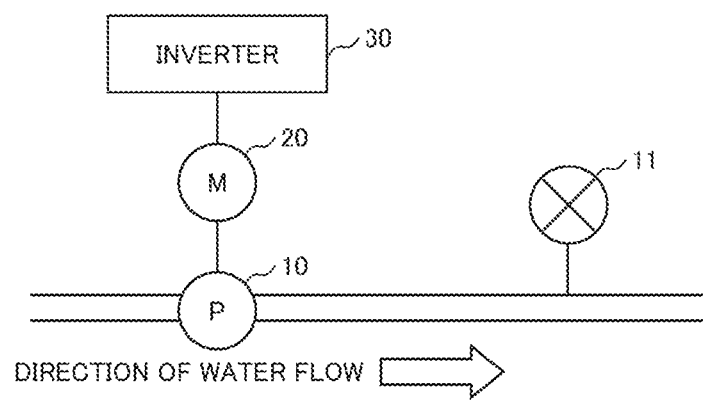
FIG. 1 is a diagram showing an overall configuration of an electric motor system according to an example 1.

First, a device configuration of the present example will be described. FIG. 1 is an overall configuration diagram of an electric motor system having an electric motor for rotationally driving a load and an inverter for controlling the electric motor in the present example. Referring to FIG. 1, reference numeral 10 denotes a pump which is driven by an electric motor indicated by reference numeral 20. Further, an inverter denoted by reference numeral 30 is connected to the electric motor 20, and the inverter 30 changes an output current to change a rotational speed of the electric motor 20 and drive the electric motor 20. When automatic operation is performed so that a water supply pressure is kept constant by an automatic water supply device, a pressure detection unit indicated by reference numeral 11 is provided on a secondary side pipe of the pump 10 to detect a pressure on a pump discharge side.

Figure 2:
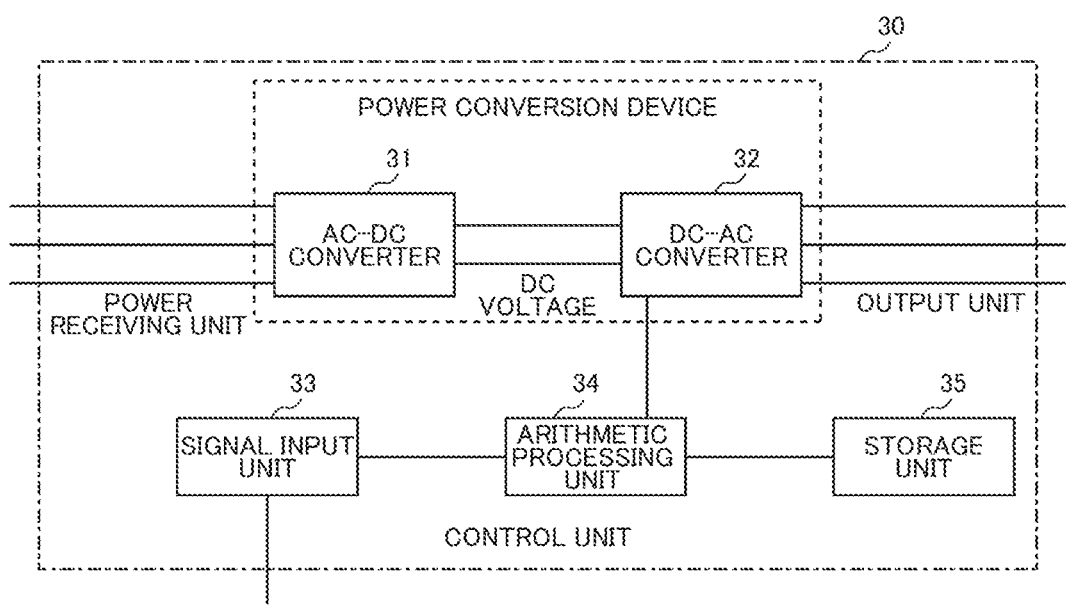
FIG. 2 is a configuration diagram of an interior of an inverter according to the example 1.

FIG. 2 is an internal configuration diagram of the inverter 30 according to the present example. Referring to FIG. 2, an AC-DC conversion unit denoted by reference numeral 31 is connected to a power receiving unit that receives a power to be supplied to the inverter, and the received AC power is converted into a DC voltage. The DC voltage is again converted into an AC power of a frequency indicated by an arithmetic processing unit denoted by reference numeral 34 by a DC-to-AC conversion unit denoted by reference numeral 32. In this case, the AC-DC conversion unit 31 and the DC-AC conversion unit 32 are collectively referred to as a power conversion device. When the rotational speed of the load is changed, a signal is input to a signal input unit denoted by reference numeral 33. The arithmetic processing unit 34 determines an output frequency according to the input signal, and instructs the DC-AC conversion unit 32 to generate the AC power of the determined frequency. Control parameters necessary for calculation to be performed by the arithmetic processing unit 34 are stored in a storage unit denoted by reference numeral 35 in advance, and the arithmetic processing unit 34 reads and writes contents stored in the storage unit 35 as occasion demands.

Next, the contents stored in the storage unit 35 will be described. FIG. 3 show the contents of a volatile memory and the contents of a nonvolatile memory which are stored in the storage unit 35 in the present example. No storage unit is provided inside the inverter, and a storage device may be attached outside the inverter for substitution.

Referring to FIG. 3(A), a rotational speed (command rotational speed to the electric motor) HzN at the time of starting a synchronization loss determination is recorded at an address 1000 in the volatile memory. A DC voltage VN inside the power conversion device at the time of starting the synchronization loss determination is recorded at an address 1001. The control parameters at addresses 1002 and 1003 are not used in the present example. A remaining time TN2 of a timer for confirming an occurrence frequency of a synchronization loss is stored at an address 1004. The number of times CN determined to be abnormal as a result of the synchronization loss determination is stored at an address 1005. A reference value VDG of the amount of a change in DC voltage for determining whether the electric motor is normal or abnormal in the synchronous loss determination is stored at an address 1006. A synchronization loss determination process is performed, and if the change in the DC voltage is equal to or more than the VDG, it is determined that the electric motor is normal, and if the change in the DC voltage is less than the VDG, it is determined that the electric motor is out of synchronization. The DC voltage is detected by a detection unit (not shown).

Referring to FIG. 3(B), a rotational speed subtraction determination reference value HzDG for determining whether or not the synchronization loss determination process is to be performed at the time of lowering the rotational speed is stored in advance at an address 2000 of the nonvolatile memory. As will be described later, when the amount of reduction in the rotational speed is small, the amount of increase in the DC voltage in the power conversion device is not large, which makes it difficult to detect the loss of synchronization. Therefore, when the amount of reduction in the rotational speed instructed is less than the HzDG, the synchronization loss determination process is not performed, and when the amount of reduction in the rotational speed is equal to or more than the HzDG, the synchronization loss determination process is performed.

The amount of decrease HDQ in the rotational number for automatically setting the synchronization loss determination reference value is stored at an address 2001 in advance. A decrease speed HDS when decreasing the rotational speed at the time of the synchronization loss determination is stored at an address 2002 in advance. The change in the DC voltage in the power conversion device increases more as the decrease speed is higher. The control parameters at an address 2003 to an address 2008 are not used in the present example, and a description of the control parameters will be omitted. A setting time TM2 of the timer for confirming the occurrence frequency of the synchronization loss is stored at an address 2009 in advance.

A parameter SLD for selecting whether or not the synchronization determination function is to be executed is stored at an address 2010 in advance. When a user sets the SLD to 0, the synchronization loss determination process is not performed and when the user sets the SLD to 1, the synchronization loss determination process is performed at the time of establishing a condition. A method DGS of setting a determination reference value at the time of the synchronization loss determination is stored at an address 2011 in advance. When the user sets the DGS to 1, the MTT stored at an address 3001 in advance is set as the determination reference value VDG. When the user sets DGS to 2, a synchronization loss determination reference value is calculated according to data tables at an address 5001 to an address 500N based on set values at an address 4001 to an address 4003 and sets as a determination reference value VDG. When the user sets the DGS to 3 the synchronization loss determination reference value stored at an address 6000 in advance is automatically calculated (auto-tuned), and a resultant ATT is set as the determination reference value VDG.

A parameter SLA for selecting whether to output a failure signal or not when the number of times CN by which it is determined that the electric motor is abnormal in the synchronization loss determination process has reached the number of times ALE previously stored at an address 7002 is stored at an address 7001 in advance. A parameter SLR for selecting whether to allow the electric motor to be restarted or not when it is determined that the electric motor is abnormal in the synchronization loss determination process is stored at an address 8001 in advance. An upper limit number RSE of permission for automatic restart is stored at an address 8002 in advance, and when the number of times CN by which it is determined that the electric motor is abnormal in the synchronization loss determination process exceeds the RSE, the restart of the electric motor is not permitted and the electric motor is kept stopped.

When automatic operation is performed so that the water supply pressure is kept constant by the automatic water supply device at address 9001, a target water supply pressure value HS is stored at an address 9001 in advance and the rotational speed is automatically controlled so that a detection value of the pressure detection unit 11 provided on a secondary side pipe of the pump 10 matches the HS.

Figure 4:
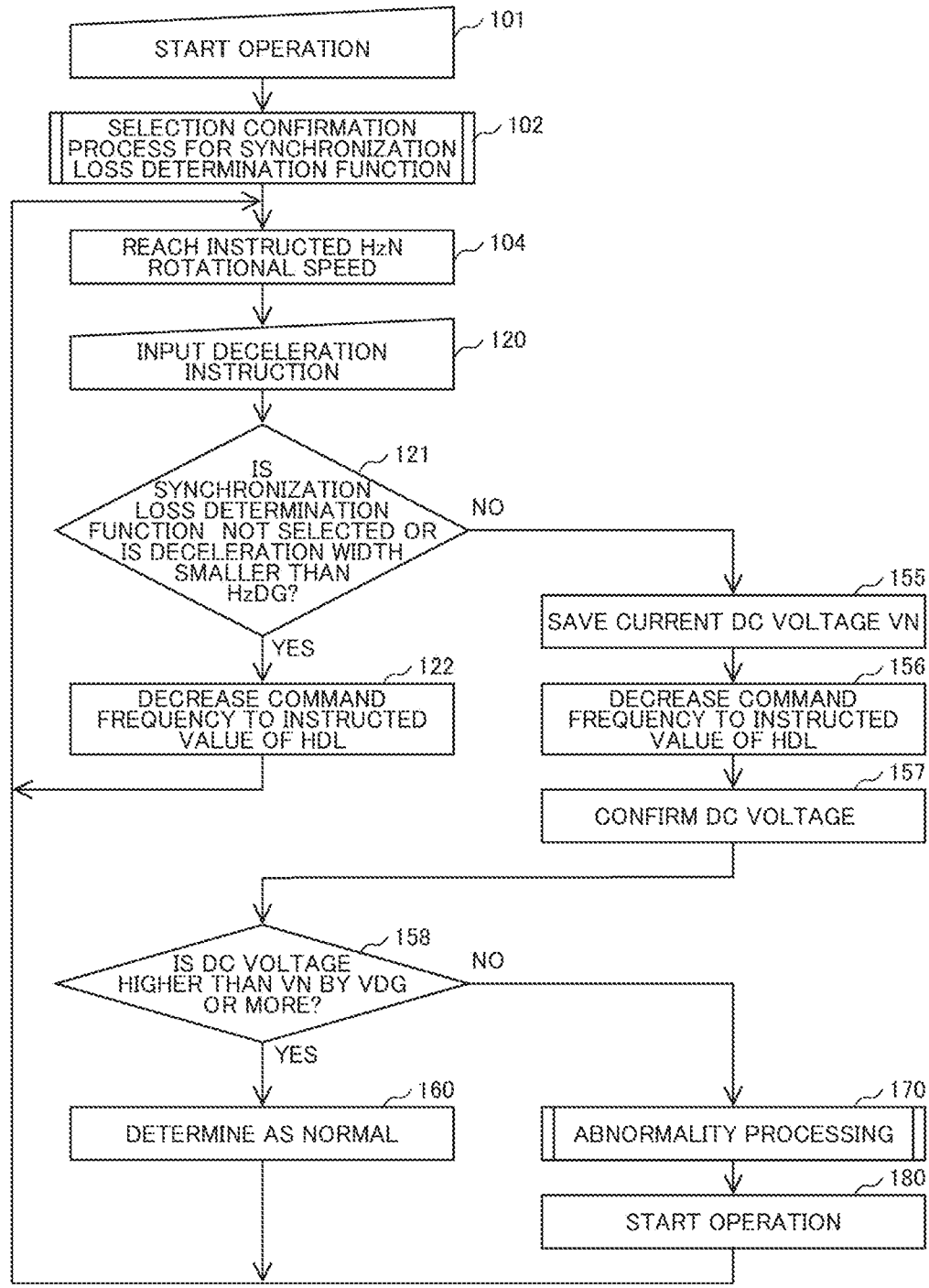
FIG. 4 is a flowchart of a control flow in a constant speed operation of a pump according to the example 1.

Next, a control flow according to the present example will be described. FIG. 4 is a control flow of operating the pump at a constant speed (rotational speed, frequency) according to the present example.

Referring to FIG. 4, after the operation has been started in Step 101, a selection confirmation process of the synchronization loss determination function is performed in Step 102. After reaching the rotational speed of HzN designated in Step 104, an instruction to decelerate is issued in Step 120, and the signal input unit 33 processes the signal.

At that time, in Step 121, a deceleration width, that is, a difference between the rotational speed HDL during deceleration HDL and the rotational speed during current operation is compared with HzDG stored previously at the address 2000 in the nonvolatile memory. When the deceleration width is smaller than HzDG, or when execution of the synchronization loss determination function is not selected in the selection confirmation process of the synchronization loss determination function in Step 102, the synchronization loss detection process of Step 155 and the subsequent steps is not performed, and the arithmetic processing unit 34 instructs the DC-AC conversion unit 32 to change an output frequency in Step 122, and the process returns to Step 104.

When the deceleration width is equal to or more than HzDG, the DC voltage VN between the AC-DC conversion unit 31 and the DC-AC conversion unit 32 in the power conversion device is stored as VN at the address 1001 in the volatile memory in Step 155. Thereafter, the arithmetic processing unit 34 instructs the DC-AC conversion unit 32 to change the output frequency in Step 156, and confirms a DC voltage immediately after deceleration has been performed in Step 157.

Figure 5:
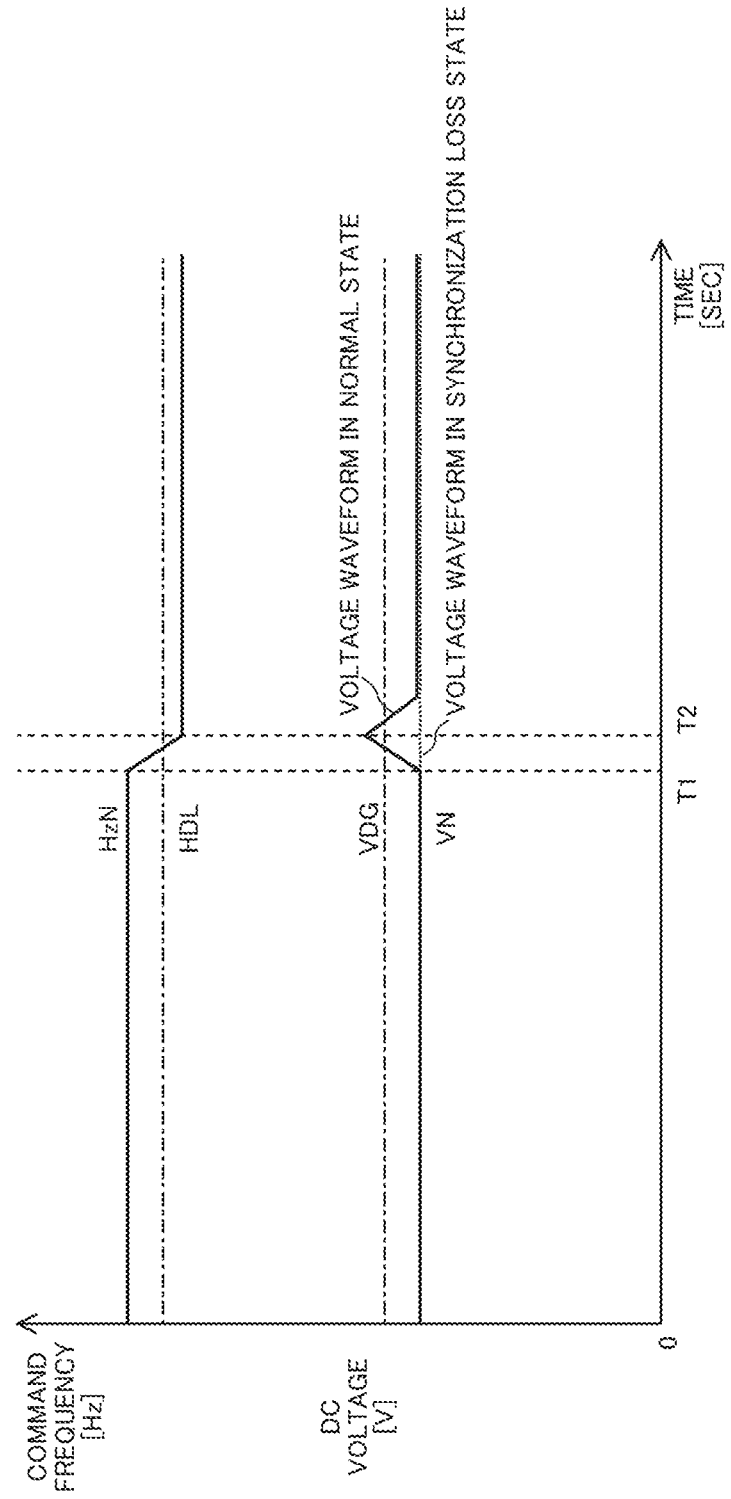
FIG. 5 is an illustrative view of a change in DC voltage to a change in rotational speed according to the example 1.

FIG. 5 shows an illustrative view of a change in the DC voltage to a change in the rotational speed. As shown in FIG. 5, the DC voltage rises from VN between a time T1 when the electric motor operates at the rotational speed HzN before deceleration and a time T2 when the deceleration is terminated. Step 155 in FIG. 4 corresponds to the time T1, Step 156 corresponds to a time period between the time T1 and the time T2, and Step 157 corresponds to the time T2. In the case of a load having a large moment of inertia such as a fan, the amount of rise is large. The amount of rise varies depending on the moment of inertia of the load, the amount of deceleration, and the speed of deceleration.

In Step 158 of FIG. 4, if the result of subtracting VN from the DC voltage immediately after deceleration is larger than VDG stored previously at the address 1006 in the volatile memory, since a rise in the DC voltage due to a regenerative energy is observed, it is determined that the electric motor is normal in Step 160, and the process returns to Step 104.

In Step 158, when the result of subtracting VN from the DC voltage immediately after deceleration is VDG or less, it is determined that the regenerative energy is not obtained by the loss of synchronization, processing at abnormality in Step 170 is performed. After the restart process has been performed, the pump is restarted in Step 180, and the process returns to Step 104.

Figure 6:
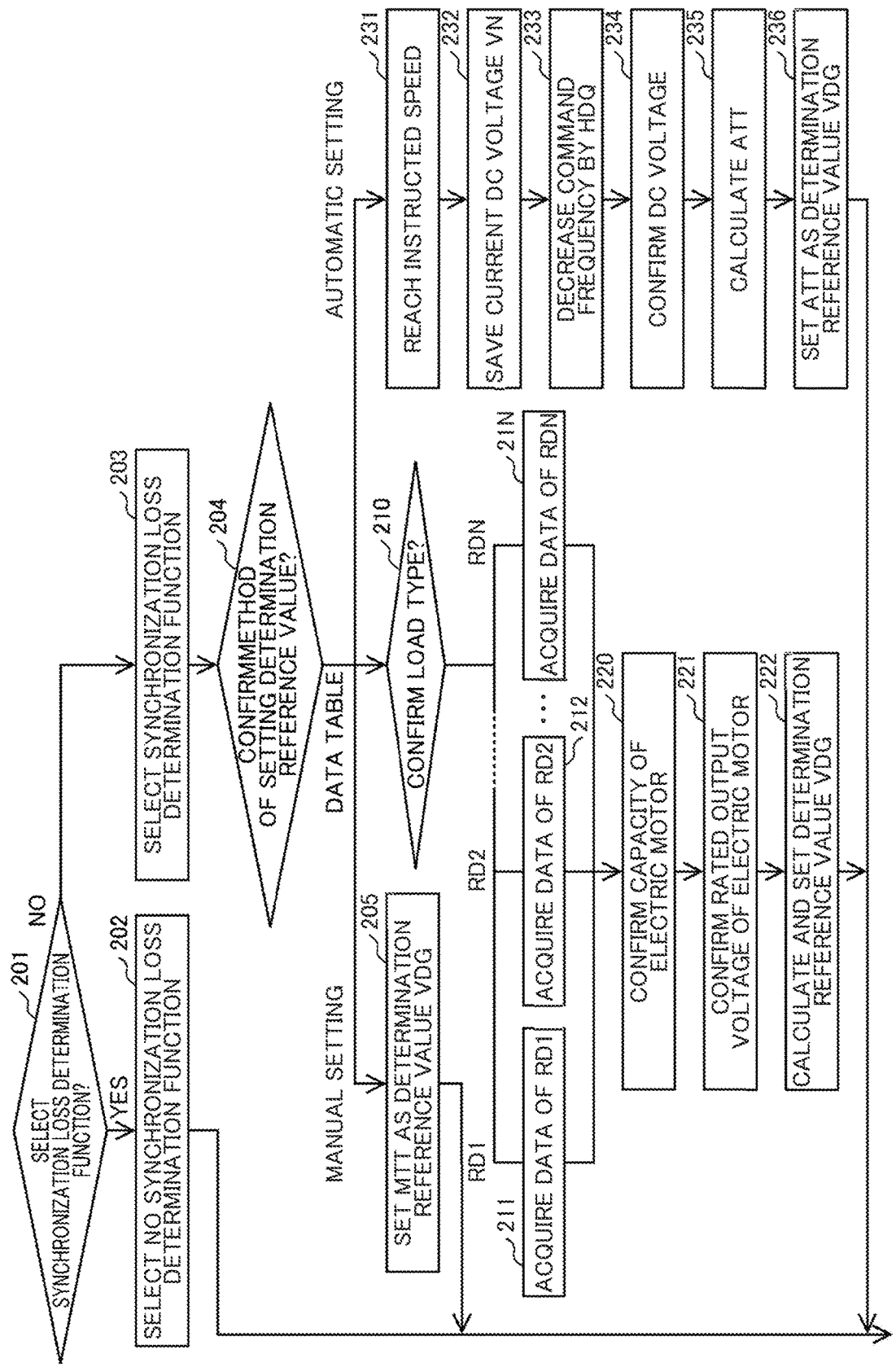
FIG. 6 is a flowchart of a control flow of a selection confirmation process of a synchronization loss determination function according to the example 1.

Next, the selection confirmation process of the synchronization loss determination function in Step 102 of FIG. 4 will be described. FIG. 6 shows the details of the selection confirmation process of the synchronization loss determination function in Step 102. In FIG. 6, the parameter SLD for selecting whether or not the synchronization loss determination function stored in advance at an address 2010 in the nonvolatile memory is executed is confirmed in Step 201. When the SLD is set to 0, the synchronization loss determination process is not performed as no selection in Step 202, and the process proceeds to Step 104 in FIG. 4. When the SLD is set to 1, it is assumed that there is the selection in Step 203, and a method of setting the determination reference value is then confirmed in Step 204.

The method DGS of setting the determination reference value stored in advance in the nonvolatile memory 2011 is confirmed in Step 204, and if DGS is set to 1, the determination reference value is manually set in Step 205, the manual setting value MTT stored at the address 3001 in advance is read, and stored as the determination reference value in VDG at the address 1006 of the volatile memory, and the process proceeds to Step 104 in FIG. 4.

If the DGS is set to 2 in Step 204, a load type is selected in Step 210. A load type RDM stored in advance at an address 4001 in the nonvolatile memory is confirmed in Step 210. If 1 is set, a determination constant RD1 corresponding to a load type 1 stored in advance at the address 5001 is set to a constant RD in Step 211. If the RDM is set to 2, a determination constant RD2 corresponding to a load type 2 stored at an address 5002 in advance is set as the constant RD in Step 212. Similarly, if the RDM is set to N, the determination constant RDN corresponding to the load type N stored in advance at an address 500N is set as the constant RD in Step 21N. In this case, RD is a constant including characteristics specific to a load application such as the moment of inertia and a rated rotational speed. Further, a rated current value KWA of the electric motor stored in advance at an address 4004 in the nonvolatile memory in Step 220 and a rated output voltage VLT of the electric motor stored in advance at an address 4003 in Step 221 are confirmed. The determination reference value VDG is obtained based on the constant RD, a capacitance KW, and the voltage VLT according to the following Expression 1 by a conversion expression created according to characteristics for each load application, and stored as the determination reference value in the VDG at an address 1006 in the volatile memory, and the process proceeds to Step 104 in FIG. 4.

$$VDG=F(RD,KWA,VLT) \qquad \text{(Ex. 1)}$$

When the DGS is set to 3 in Step 204, after reaching a speed designated in Step 231, a DC voltage VN between the AC-DC conversion unit 31 and the DC-AC conversion unit 32 in the power conversion device is stored as VN at the address 1001 in the volatile memory in Step 232. The arithmetic processing unit 34 instructs the DC-AC conversion unit 32 to lower the output frequency by HDQ in Step 233, and confirms the DC voltage immediately after deceleration in Step 234. Half of the DC voltage change at that time is stored at the address 6000 in the nonvolatile memory as the determination reference value ATT by automatic setting in Step 235. ATT is stored in VDG at the address 1006 in the volatile memory as the determination reference value, the designated speed returns to a speed before the determination start, and the process proceeds to Step 104.

In Steps 231 to 235, if a value other than 0 has been already stored as the automatic set value ATT at the address 6000 in the nonvolatile memory without performing confirmation every time the synchronization loss determination function is selected and confirmed, the ATT may be merely stored as the determination reference value in the VDG at the address 1006 in the volatile memory in Step 236 and the process may proceed to Step 104.

As described above, since the amount of rise in the DC voltage varies depending on the deceleration amount and the speed of deceleration in addition to the moment of inertia of the load, taking the deceleration amount and the speed of deceleration into consideration, the determination reference value may be regarded as a determination reference value VDG' according to the following Expression 2.

$$VDG'=VDG\times(\text{deceleration amount})\times(\text{deceleration speed}) \quad (\text{Ex. 2})$$

However, in the present example, a constant deceleration amount or more is set during the operation as a condition for performing the synchronization loss determination. Further, since there is no rise in the DC voltage at the time of the loss of synchronization, even if the determination reference value VDG does not take the deceleration amount and the speed of deceleration into account, when there is a deceleration amount necessary for determination during operation, the synchronization loss determination can be sufficiently performed.

Figure 7:
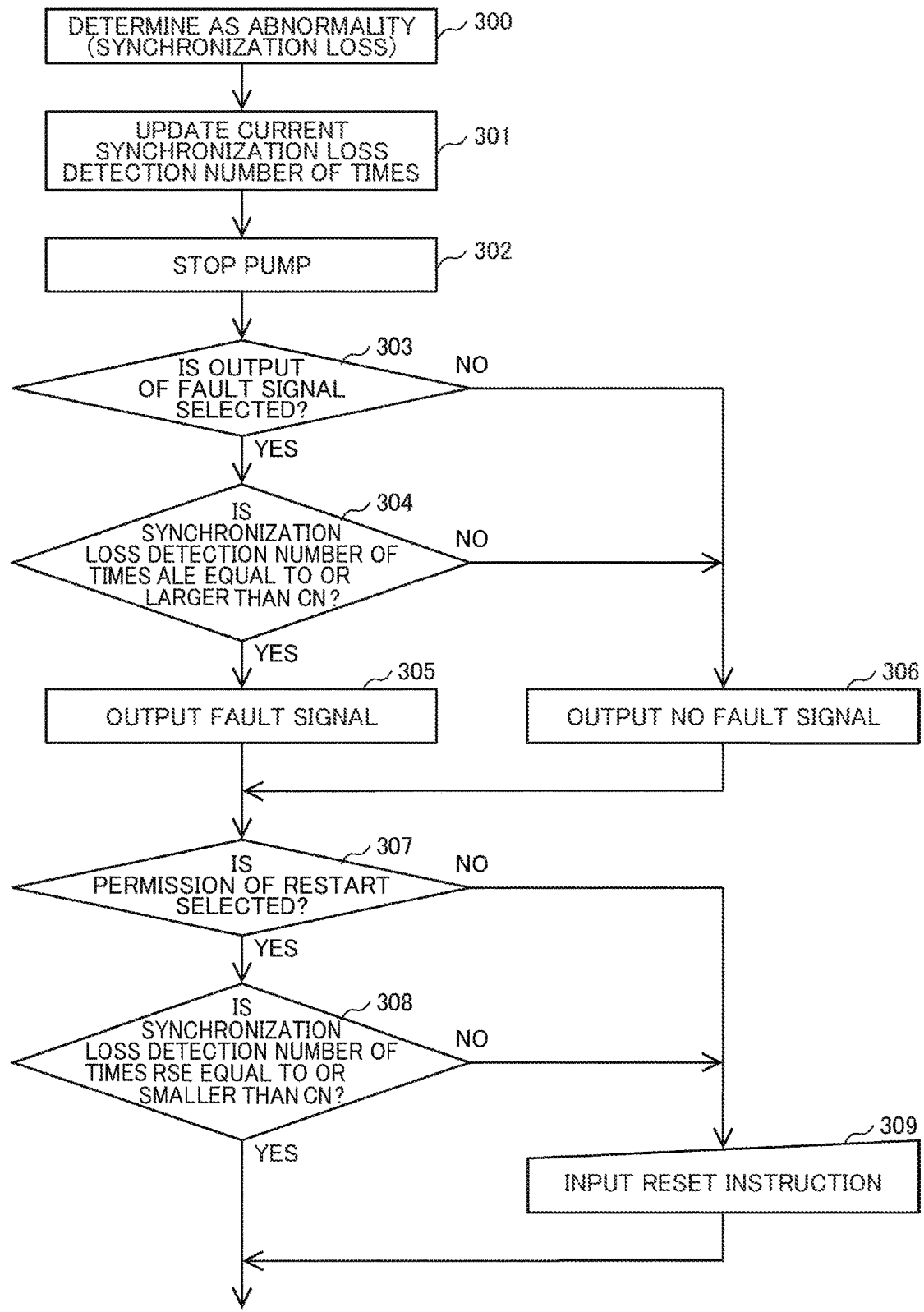
FIG. 7 is a flowchart of a control flow of an abnormality process according to the example 1.

Next, processing at abnormality in Step 170 of FIG. 4 will be described. FIG. 7 shows the details of the abnormality processing in Step 170. In FIG. 7, after it is determined that the electric motor is abnormal (out of synchronization) in Step 300, the current synchronization loss detection frequency is updated in Step 301, 1 is added to the stored value at the address 1005 in the volatile memory, and the pump is stopped in Step 302. The parameter SLA for selecting whether or not the failure signal stored in advance at the address 7001 in the nonvolatile memory 7001 is output is confirmed in Step 303. If the SLA is set to 0, the process proceeds to Step 307 with no output of the failure signal in Step 306. If SLA is set to 1, the synchronization loss detection number of times ALE by which to start the output of the failure signal stored in advance at the address 7002 in the nonvolatile memory is compared with the current synchronization loss detection number of times CN stored at the address 1005 in the volatile memory in Step 304. If the ALE is equal to or more than CN, the failure signal is output in Step 305. If ALE is less than CN, it is determined in Step 306 that no failure signal is output and the process proceeds to Step 307.

The permission of restart is confirmed in Step 307. It is desirable to change the condition of permission to restart depending on the number and frequency of the loss of synchronization, the characteristics of equipment, or the use purpose. The parameter SLR for selecting the permission of automatic restart stored at the address 8001 in the nonvolatile memory in advance is confirmed. If the restart is permitted, the process proceeds to Step 308. If the restart not permitted, the process proceeds to Step 309. The upper limit number RSE of permission for automatic restart stored at the address 8002 in the nonvolatile memory in advance is compared with the current synchronization loss detection number of times CN stored at the address 1005 in the volatile memory in Step 308, and if the RSE is equal to or less than the CN, the process proceeds to Step 180 in FIG. 4. If the RSE exceeds the CN, the process proceeds to Step 309. The electric motor waits for the input of the reset instruction by manual operation in Step 309, and the electric motor is not restarted until receiving the reset instruction. After having received the reset instruction, the process proceeds to Step 180 in FIG. 4, and the electric motor starts the operation.

When a frequency is added to the condition of permission for restart, a set value of the timer TM2 for confirmation of a synchronization loss frequency stored in advance at an address 2009 in the nonvolatile memory at the time of detecting the loss of synchronization is stored in the remaining time TN2 of the timer 2 at the address 1004 in the volatile memory, and the TN2 is counted down. When the loss of synchronization is again detected before the TN2 becomes 0, a condition that restart is not permitted may be added.

The control flow when operating the electric motor at a constant speed has been described above, but the control flow can also be applied to automatic operation in which a water supply pressure is kept constant by the automatic water supply device. In other words, upon detection of a reduction in a discharge side pressure, the operation starts in Step 101 of FIG. 4. After the rotational speed has reached the designated HzN in Step 104 subsequent to processing in Steps 102 and 103, it is determined whether or not the discharge side pressure detected by the pressure detection unit 11 is lower than a target pressure HS stored in advance at the address 9001 in the nonvolatile memory. When the discharge side pressure is lower than the target pressure HS, an instruction for acceleration is issued, the signal input unit 33 processes the signal, and the arithmetic processing unit 34 instructs the DC-AC conversion unit 32 to change the output frequency, and the control is made so as to return to Step 104. Conversely, when the discharge side pressure is higher than the target pressure HS, the processing may be executed in Step 120 to perform an instruction for deceleration, and processing in Step 121 and subsequent steps in FIG. 4 may be performed.

As described above, the present example is directed to the inverter that controls the synchronous electric motor that rotationally drives the load, and includes the arithmetic processing unit that determines the rotational speed of the synchronous electric motor, the storage unit that stores the control parameter necessary for calculation to be performed by the arithmetic processing unit, and the power conversion device that supplies a driving current to an armature of the synchronous electric motor, in which the arithmetic processing unit changes the rotational speed during operation of the synchronous electric motor, and determines that the electric motor is out of synchronization when the amount of change in the DC voltage in the power conversion device is equal to or less than the predetermined value.

In addition, in the synchronous electric motor system having the synchronous electric motor that rotationally drives the load and the inverter that controls the synchronous electric motor, the inverter is configured as described above.

Further, when the amount of change in the rotational speed of the synchronous electric motor is equal to or more than the predetermined value, it is determined that the electric motor is out of synchronization.

As a result, when the loss of synchronization occurs and the load is not rotationally driven and does not work, the state is detected and the motor is promptly restarted so as to drive the load and continue the work.

EXAMPLE 2

In the present example, in a synchronous electric motor that is driving a load, a rotational speed is intentionally changed in a constant cycle, and a loss of synchronization is detected according to a change in DC voltage in a power conversion device when a rotation speed of the electric motor is lowered. When the amount of change in the DC voltage in the power conversion device does not exceed a predetermined value, it is determined that the electric motor is out of synchronization, and the normal operation is started again by restarting the electric motor.

The device configuration in the present example is the same as that in FIGS. 1 and 2 of the example 1.

In addition, in FIG. 3(A), the storage contents of the storage unit 35 stores the remaining count time TN1 of the timer for setting a cycle in which the synchronization loss determination process is performed at the address 1003 in the volatile memory. A decrease amount HDQ by which the rotational speed is reduced at the time of automatically setting the synchronization loss determination reference value or at the time of determining that the electric motor is out of synchronization is stored in advance at the address 2001 in the nonvolatile memory. A decrease speed HDS for decreasing the rotational speed at the time of determining that the electric motor is out of synchronization is stored in advance at the address 2002. An increase amount HAQ for increasing the rotational speed at the time of determining that the electric motor is out of synchronization is stored in advance at the address 2003. An increase speed HAS for increasing the rotational speed at the time of determining that the electric motor is out of synchronization is stored in advance at the address 2004. A cycle TM1 for performing a synchronization loss determination process is stored in advance at the address 2008. Since the contents of other volatile memories and other nonvolatile memories to be used are the same as those in the example 1, a description of the contents in the memories will be omitted.

Figure 8:
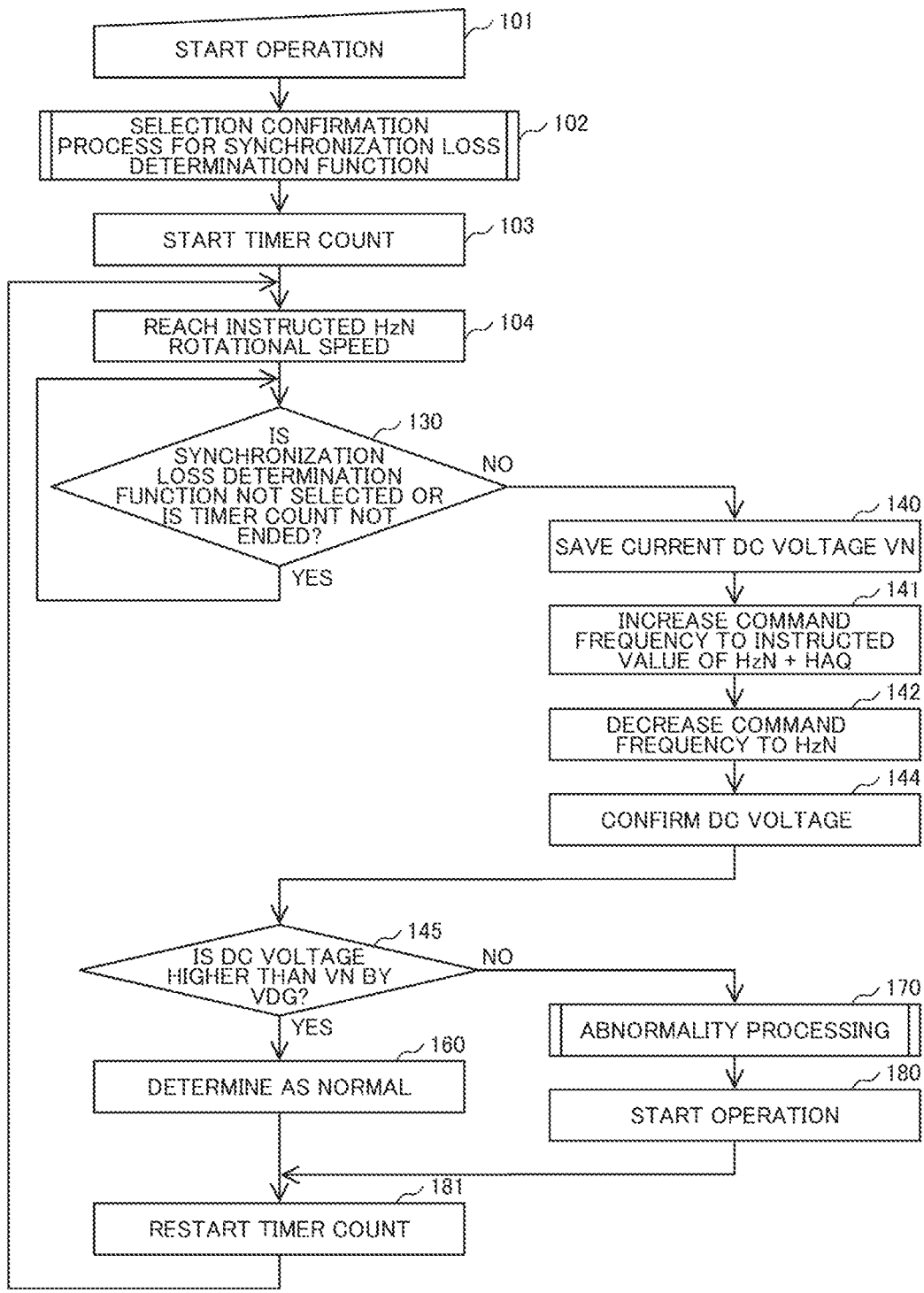
FIG. 8 is a flowchart of a control flow in a constant speed operation of a pump according to an example 2.

Next, a control flow in the present example will be described. FIG. 8 is a control flow in the present example when a pump is operated at a constant speed (constant rotational speed, constant frequency).

Referring to FIG. 8, after the operation has been started in Step 101, a selection confirmation process of the synchronization loss determination function is performed in Step 102. The selection confirmation process of the synchronization loss determination function has already been described with reference to FIG. 6 as in the example 1, and therefore, a description of the selection confirmation process will be omitted. After the selection confirmation process of the synchronization loss determination function, the setting value of the cycle timer TM1 for the synchronization loss determination stored in advance at the address 2008 in the nonvolatile memory in Step 103 is stored in the remaining time TN1 of the timer 1 at the address 1003 in the volatile memory to start counting down of the TN1. After having reached the rotational speed of HzN designated in Step 104, if the synchronization loss determination function is not selected in Step 130 or if the counting of the timer TN1 has not been completed, the control flow waits for the counting completion of the timer TN1. If the synchronization loss determination function has been selected and the counting of the timer TN1 has been completed, the DC voltage VN between the AC-DC conversion unit 31 and the DC-AC conversion unit 32 in the power conversion device is stored as VN at the address 1001 in the volatile memory in Step 140. Thereafter, in Step 141, the arithmetic processing unit 34 instructs the DC-AC conversion unit 32 to change the output frequency to a value obtained by adding the rotational speed addition amount HAQ at the time of determination to the rotational speed HzN stored at the address 1000 in the volatile memory, and changes a command rotational speed at a speed of the rotational speed addition speed HAS at the time of determination. In Step 142, the arithmetic processing unit 34 instructs the DC-AC conversion unit 32 to return the output frequency to the HzN, and changes the command rotational speed at the speed of the rotational speed subtraction speed HDS at the time of determination. The DC voltage immediately after deceleration is confirmed in Step 144.

Figure 9:
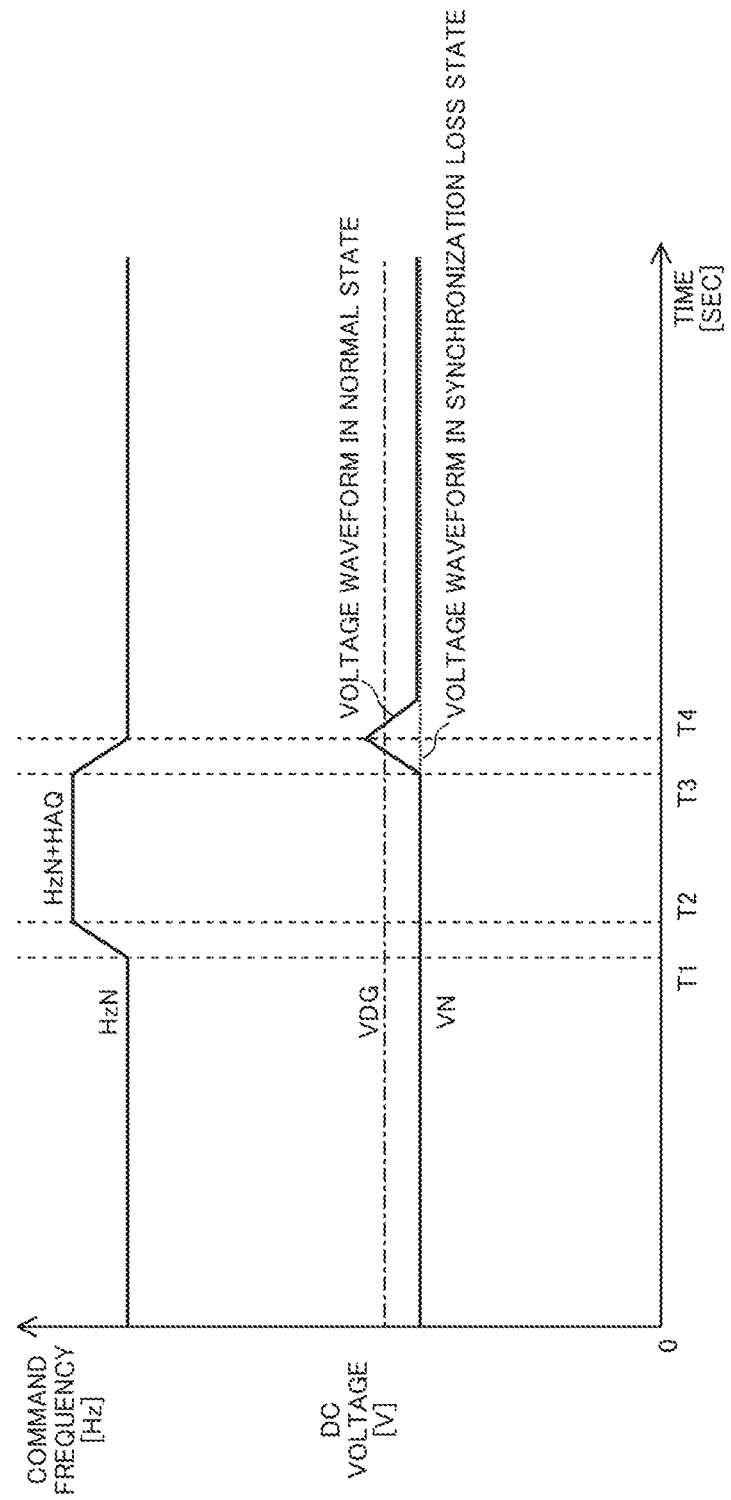
FIG. 9 is an illustrative view of a change in DC voltage to a change in rotational speed in the example 2.

FIG. 9 shows an illustrative view of a change in the DC voltage to a change in the rotational speed in the present example. As shown in FIG. 9, the DC voltage rises from the VN between the time T3 at which to operate at the rotational speed obtained by adding the HAQ to the HzN before deceleration and the time T4 at which the deceleration is terminated. Step 140 in FIG. 8 corresponds to the time T1, Step 141 corresponds to a time period from the time T1 to the time T2, Step 142 corresponds to a time period from the time T3 to the time T4, and Step 144 corresponds to the time T4.

In Step 145 of FIG. 8, if the result of subtracting the VN from the DC voltage immediately after deceleration is larger than the VDG stored in advance at the address 1006 in the volatile memory, a rise in the DC voltage due to the regenerative energy is found. Therefore, it is determined that the electric motor is normal in Step 160, the timer restarts the counting in Step 181, and the process returns to Step 104.

In Step 145, if the result of subtracting the VN from the DC voltage immediately after the deceleration is equal to or less than the VDG, it is determined that the regenerative energy is not obtained by the loss of synchronization, and processing at abnormality in Step 170 is performed. After the restarting process has been performed, the pump is restarted in Step 180, the counting of the timer is restarted in Step 181, and the process returns to Step 104. The processing at abnormality in Step 170 has already been described with reference to FIG. 7 as in the example 1, and therefore a description of the processing at abnormality will be omitted.

As in the example 1, in the present example, since the rise value of the DC voltage varies depending on the moment of inertia of the load, it is desirable that the DC voltage determination reference value VDG, the addition amount HAQ, the subtraction amount HDQ, and the subtraction speed HDS are changed depending on the load.

Even in a load whose rotational speed does not change at all, the present example is advantageous in that the loss of synchronization can be detected in a constant period according to the timer setting.

Further, in the present example, the load having the square reduction torque characteristic for the pump (hereinafter referred to as "square reduction load") is exemplified, but the present invention is not necessarily limited to the above load.

Although the control flow in the case of operating at the constant speed has been described above, but can also be applied to automatic operation in which the water supply pressure is kept constant in the automatic water supply device. In other words, when the decrease in the discharge side pressure is detected, the operation starts in Step 101 of FIG. 8, and after processing in Steps 102, 103, and 104 has been completed, if the synchronization loss determination function is not selected in Step 130 or if the counting of the timer Tn1 is not completed, the conventional pressure constant control is performed. In other words, it is determined whether or not the discharge side pressure detected by the pressure detection unit 11 is lower than the target pressure HS stored in advance at the address 9001 in the nonvolatile memory. If the discharge side pressure is lower than the target pressure HS, an instruction for the acceleration is issued. When the instruction for the acceleration has been issued, the signal input unit 33 processes the signal, the arithmetic processing unit 34 instructs the DC-AC conversion unit 32 to change the output frequency, and the control flow returns to Step 104 under the control. On the contrary, when the discharge side pressure is higher than the target pressure HS, an instruction for the deceleration is issued. When the instruction for the deceleration has been issued, the signal input unit 33 processes the signal, the arithmetic processing unit 34 instructs the DC-AC conversion unit 32 to change the output frequency, and the control flow returns to Step 104 under the control. Hereinafter, the same processing steps as those in the case of the pump constant speed operation in Step 140 and subsequent steps in FIG. 8 may be performed.

As described above, in the present example, after the rotational speed of the synchronous electric motor has been increased, the rotational speed is then lowered, to thereby perform the loss of synchronization.

EXAMPLE 3

In the example 2, after completion of the counting of the timer, the rotational speed is first increased, and the rotational speed is then returned to determine whether the electric motor is out of synchronization or not according to a rise in the DC voltage. On the contrary, in the present example, after completion of the counting of a timer, a rotational speed is first decreased to determine whether an electric motor is out of synchronization or not, and thereafter the rotational speed is returned to an original rotational speed if the electric motor is normal.

Figure 10:
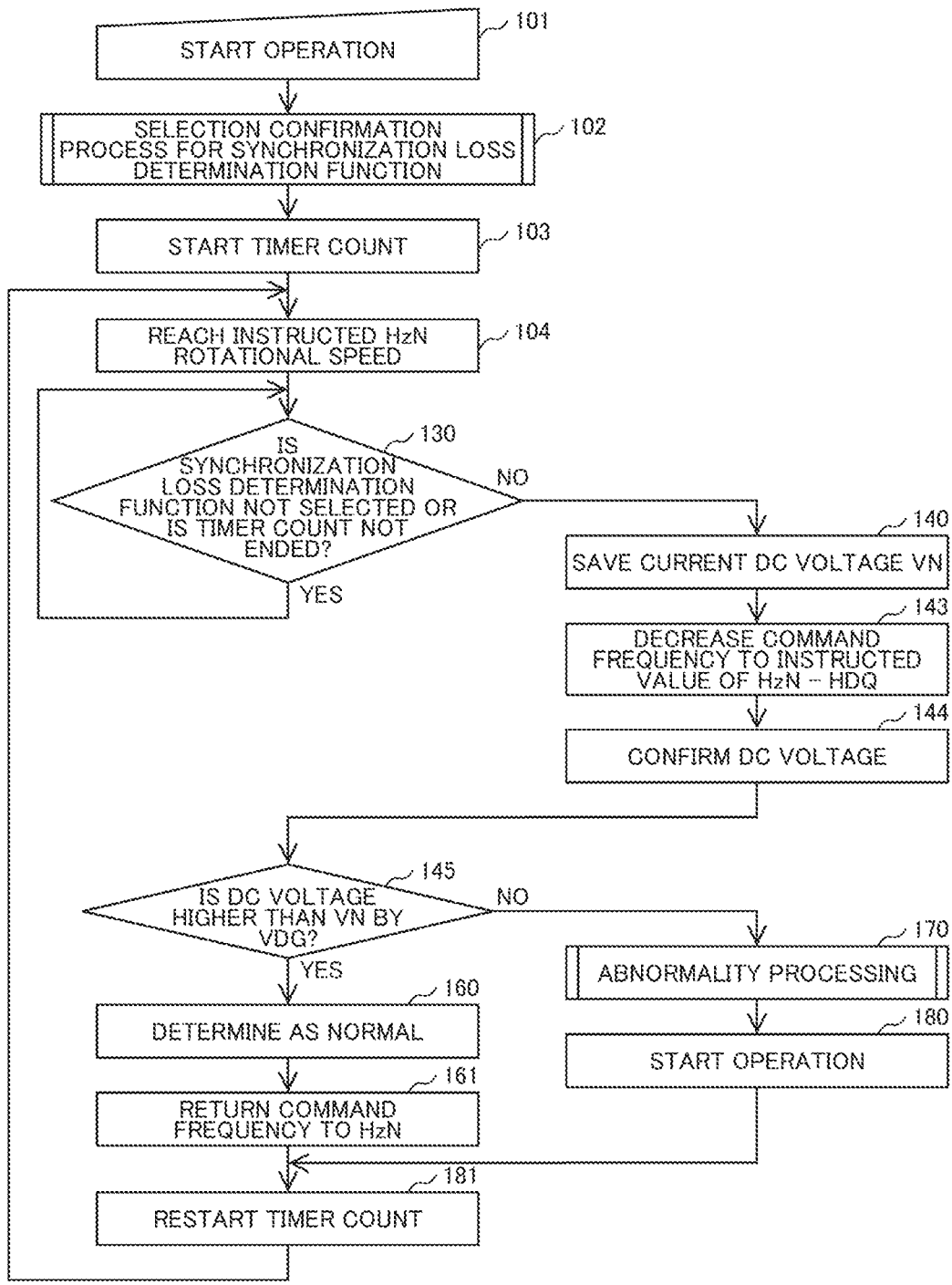
FIG. 10 is a flowchart of a control flow in a constant speed operation of a pump according to an example 3.

FIG. 10 is a control flow in the case where a pump is operated at a constant speed (constant rotation speed, constant frequency) according to the present example.

Referring to FIG. 10, steps different from those in FIG. 8 reside in that Steps 141 and 142 are replaced with Step 143, and Step 161 is added. The other steps are identical with the steps in FIG. 8 and denoted by the same symbols, and a description of the same steps will be omitted.

Referring to FIG. 10, in Step 140, a DC voltage VN between an AC-DC conversion unit 31 and a DC-AC conversion unit 32 in a power conversion device is stored as VN at an address 1001 in a volatile memory. Thereafter, a rotational speed is decreased in Step 143, and a DC voltage immediately after deceleration is confirmed in Step 144. If it is determined in Step 160 that the DC voltage is normal, an arithmetic processing unit 34 instructs the DC-AC conversion unit 32 to return an output frequency to HzN in Step 161, and changes a command rotational speed at the speed of a rotational speed addition speed HAS at the time of the determination.

FIG. 11 shows an illustrative view of a change in DC voltage to a change in rotational speed according to the present example. In FIG. 11, Step 140 in FIG. 10 corresponds to a time T1, Step 143 in FIG. 10 corresponds to a time period from the time T1 to a time T2, and Step 144 in FIG. 10 corresponds to the time T2.

A feature of the example 2 resides in that in a device that always requires the pressure or the flow rate which are equal to or more than a certain level, the loss of synchronization can be detected while ensuring a necessary workload. Although an output more than necessary is temporarily carried out, the amount of the output is significant, and there is no concern that the output will be excessive. On the other hand, the feature of the present example resides in that in a device whose pressure or flow rate should not exceed a certain value, a loss of synchronization can be detected without exceeding a restriction. As a result, there is no possibility of imposing a strain on secondary equipment due to an excessive pressure or the like.

The control flow in the case of operating at a constant speed has been described above, but the control flow can also be applied to automatic operation in which a water supply pressure is kept constant in an automatic water supply device. In other word, when a decrease in a discharge side pressure is detected, the operation is started in Step 101 of FIG. 10, after the processing in Steps 102, 103, and 104, if a synchronization loss determination function has not been selected in Step 130 or if counting of a timer TN1 has not been completed, the conventional pressure constant control is performed. In other words, it is determined whether or not a discharge side pressure detected by a pressure detection unit 11 is lower than a target pressure HS stored in advance at an address 9001 of a nonvolatile memory. If the discharge side pressure is lower than the target pressure HS, an instruction for acceleration is issued. When the instruction for the acceleration has been issued, the signal input unit 33 processes the signal, the arithmetic processing unit 34 instructs the DC-AC conversion unit 32 to change the output frequency, and the control flow returns to Step 104 under the control. Conversely, if the discharge side pressure is higher than the target pressure HS, an instruction for deceleration is issued. When the instruction for the deceleration has been issued, the signal input unit 33 processes the signal, the arithmetic processing unit 34 instructs the DC-AC conversion unit 32 to change the output frequency, and the control flow returns to Step 104 under the control. Hereinafter, the same processing steps as those in the case of the pump constant speed operation in Step 140 and subsequent steps in FIG. 10 may be performed.

As described above, in the present example, after the rotational speed of the synchronous electric motor has been lowered, the rotational speed of the synchronous electric motor is raised, to thereby determine whether the electric motor is out of synchronization or not.

EXAMPLE 4

In the present example, in a synchronous electric motor that is driving a load, a rotational speed is intentionally changed in a constant cycle, and a load current value before and after a rotational speed of the electric motor is changed is compared with a load current value stored in advance to detect a loss of synchronization. If a difference between a measured value of the load current value and the stored value exceeds a predetermined value, it is determined that the electric motor is out of synchronization, and the electric motor is restarted to again start normal operation.

The configuration of the device according to the present example is the same as that of FIGS. 1 and 2 of the example 1. In addition, in the contents stored in the storage unit 35, the contents already described above will be omitted, and only the new matter will be described.

Referring to FIG. 3(A), a load current value AN at the time of starting a synchronization loss determination is recorded at the address 1002 of a volatile memory. In addition, referring to FIG. 3(B), a range ADQ allowable as an error between the measured value of the load current value and the stored value at the time of a synchronization loss determination is stored in advance at an address 2005 of a nonvolatile memory. A load current value ADG1 in a first determination condition (rotational speed) is stored in advance at an address 2006. A load current value ADG2 in a second determination condition (rotational speed) is stored in advance at an address 2007.

Figure 12A:
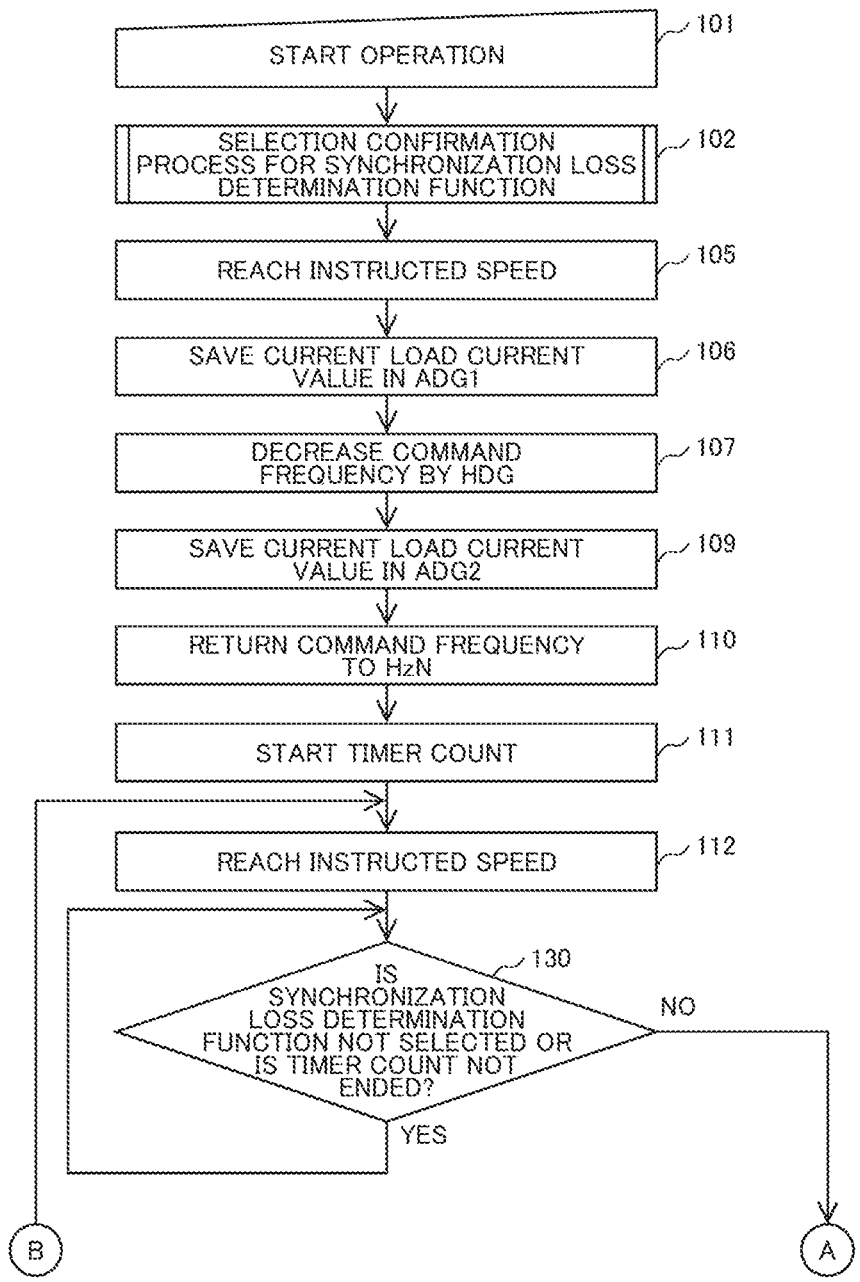
FIG. 12A is a flowchart of a first half of a control flow in a constant speed operation of a pump according to an example 4.

Next, a control flow in the present example will be described. FIG. 12 is the control flow in the present example in the case where a pump is operated at a constant speed (a constant rotational speed and a constant frequency). For reasons of space limitations, FIG. 12 is divided into FIGS. 12A and 12B, but those figures are continuous to each other by symbols A and B. In the following description, FIG. 12A and FIG. 12B will be collectively described as FIGS. 12A and 12B.

Referring to FIG. 12, after the operation has been started in Step 101, a selection confirmation process of a synchronization loss determination function is performed in Step 102. After reaching a speed designated in Step 105, a load current value on a secondary side which is a current value on an output side of a DC-AC conversion unit 32 in a current power conversion device is stored as a determination reference value ADG1 at an address 2006 in a nonvolatile memory. Thereafter, an arithmetic processing unit 34 instructs the DC-AC conversion unit 32 to lower an output frequency by HDQ in the step 107. A load current value on the secondary side of the DC-AC conversion unit 32 in the power conversion device is stored as a determination reference value ADG2 at an address 2007 in the nonvolatile memory in Step 109, and the designated speed is returned to a speed before the determination start in Step 110.

Steps 106 to 110 will be omitted in the case where values other than 0 have already been stored as the determination reference values ADG1 and ADG2 at the addresses 2006 and 2007 in the nonvolatile memory even if confirmation is performed every time the operation starts, and the process may be enough to proceed to Step 111.

A setting value of a cycle timer TM1 for synchronization loss determination which has been stored in advance at an address 2008 in the nonvolatile memory is stored in a remaining time TN1 of a timer 1 at an address 1003 of the volatile memory, and the countdown of the TN1 is started. After reaching the speed designated in Step 112, if the synchronization loss determination function is not selected in Step 130 or if counting of the timer TN1 has not been completed in Step 130, the control flow waits for the counting completion of the timer TN1. If the synchronization loss determination function has been selected and the counting of the timer TN1 has been completed, the load current value on the secondary side of the DC-AC conversion unit 32 in the current power conversion device is stored as the load current value AN at the address 1002 in the volatile memory in Step 146.

The values of the AN and the ADG1 are compared with each other in Step 147 and if a difference between those values falls within a range ADQ which is allowable as an error between a measured value of the load current value and a stored value at the time of the synchronization loss determination stored in advance at the address 2005 in the nonvolatile memory, the process proceeds to Step 148, and if the difference exceeds the ADQ, the processing at abnormality in Step 170 is performed. After the restart process has been performed, the pump is restarted in Step 180, counting of the timer is restarted in Step 181 restart, and the process returns to Step 112.

FIG. 13 is an illustrative view of a change in the load current to a change in the rotation speed according to the present example. Referring to FIG. 13, Step 147 in FIG. 12 corresponds to the time T1.

The arithmetic processing unit 34 instructs the DC-AC conversion unit 32 to lower the output frequency by HDQ in Step 148 of FIG. 12, and after reaching the speed designated in Step 150, the load current value on the secondary side of the DC-AC conversion unit 32 in the power conversion device is stored as the load current value AN at the address 1002 in the volatile memory in Step 151.

The values of the AN and the ADG2 are compared with each other in Step 152 of FIG. 12, and if a difference between those values falls within the range ADQ that is allowable as an error between the measured value of the load current value and the stored value at the time of the synchronization loss determination stored in advance at the address 2005 in the nonvolatile memory, it is determined that the electric motor is normal in Step 160 and the designated speed is returned to the speed before the determination start in Step 162. The counting of the timer is resumed in Step 181 and the process returns to Step 112. If the difference exceeds the ADQ, the processing at abnormality in Step 170 is performed. The pump is restarted in Step 180 after the restart process has been performed, counting of the timer is restarted in Step 181, and the process returns to Step 112. Step 152 corresponds to the time T3 in FIG. 13.

Since the selection confirmation process of the synchronization loss determination function in Step 102 and the abnormality process in Step 170 have already been described with reference to FIGS. 6 and 7 as in the example 1, a description of the selection confirmation process will be omitted.

FIG. 14 shows an example of a relationship between a normal current and a load current at the time of a loss of synchronization in the case of the square reduction load. As shown in FIG. 14, even in a state where the electric motor is out of synchronization, a current comparable to an induced voltage flows in the electric motor, and a current value of the current may be equal to a current value in a normal rotation state. Therefore, although it is difficult to estimate the current value and set the estimated current value in advance, the difference between the current value in the normal rotation state and the current value in the synchronization loss state is clarified with the use of the present example, thereby being capable of simply detecting the loss of synchronization.

EXAMPLE 5

In the present example, in the case where a relationship between a current flowing only by the induced voltage and a current flowing at a normal load of the application is known in advance while the electric motor is out of synchronization, an example in which it can be determined whether the electric motor is out of synchronization or not with the use of a characteristic of a load will be described.

FIG. 14 shows a relationship between the normal current and the load current at the time of a loss of synchronization in the case of the square reduction load. A current in the synchronization loss is larger than the load current in the normal state at a rotational speed N1, and the current in the synchronization loss is smaller than the load current in the normal state at a rotational speed N2. In addition, the load current in the normal state is identical with the load current in the synchronization loss at a rotational speed N3. In the load current in the normal state, for example, when the square reduction load is used for the pump, characteristic curves of the load current differ depending on the situation of an installation site such as the type and capacity of the pump and the degree of opening of the valve. Also, in the current in the synchronization loss, the characteristics are different depending on an induced voltage of a permanent magnet synchronous electric motor, a winding resistance, and so on. Therefore, if the type of application equipment such as a pump, the load situation at the installation site and the type of synchronous electric motor are different from each other, the rotational speeds N1, N2, and N3 in FIG. 14 change.

FIG. 15 shows a relationship between the normal current and the load current in the synchronization loss state in the case of the constant torque load. The current in the synchronization loss is smaller than the load current in the normal state at a rotational speed N4, and the current in the synchronization loss is larger than the load current in the normal state at a rotational speed N5. In addition, the load current in the normal state is identical with the load current in the synchronization loss at a rotational speed N6. If the type of application equipment, the load situation at the installation site and the type of synchronous electric motor are different from each other, the rotational speeds N4, N5, and N6 in FIG. 15 change.

FIG. 16 shows a relationship between the normal current and the load current in the synchronization loss state in the case of the constant output load. The current in the synchronization loss is smaller than the load current in the normal state at a rotational speed N7, and the current in the synchronization loss is larger than the load current in the normal state at a rotational speed N8. In addition, the load current in the normal state is identical with the load current in the synchronization loss at a rotational speed N9. If the type of application equipment, the load situation at the installation site and the type of synchronous electric motor are different from each other, the rotational speeds N7, N8, and N9 in FIG. 16 change.

Figure 17:
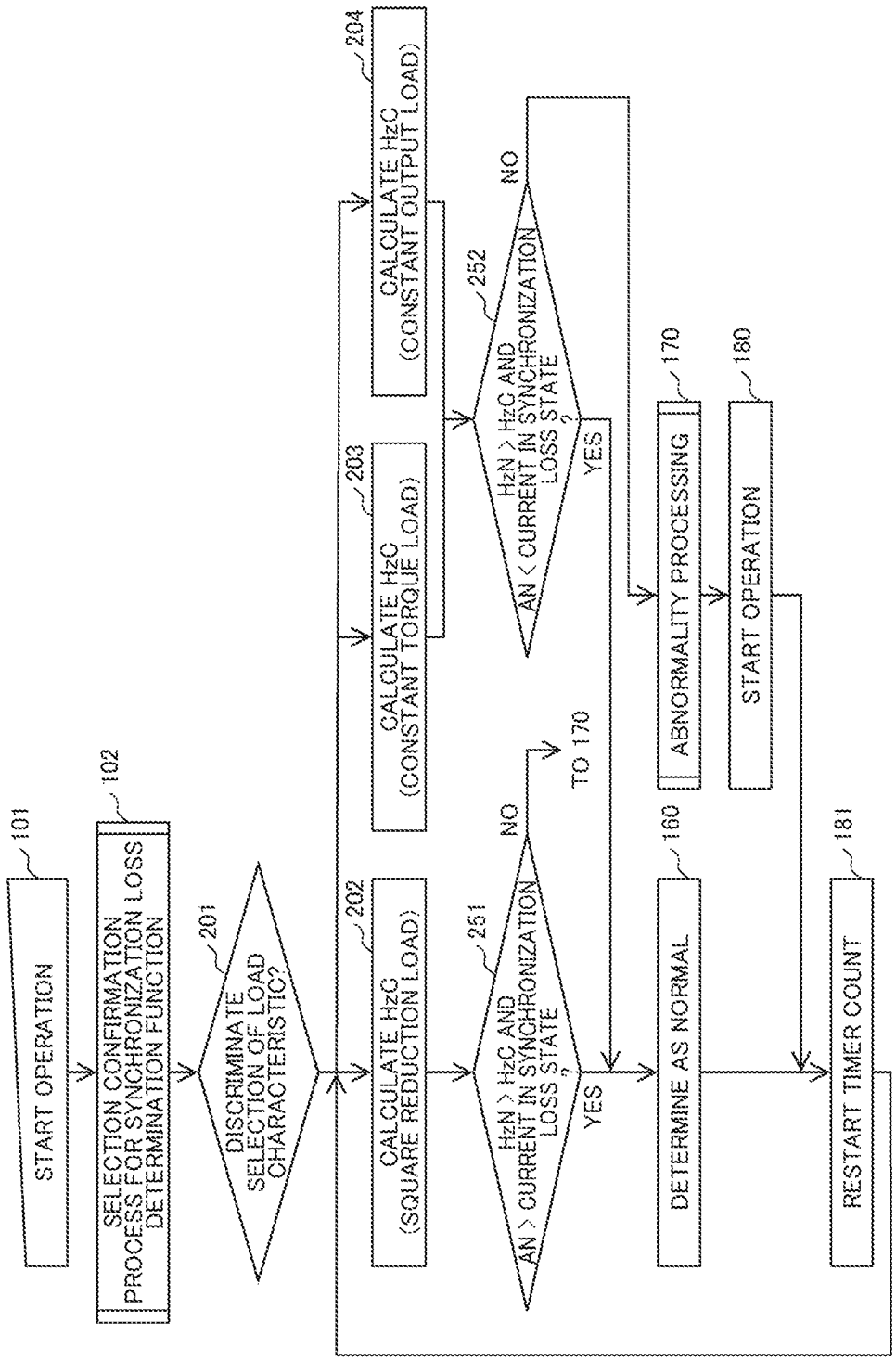
FIG. 17 is a flowchart of a control flow of a synchronization loss detection leveraging a difference between the load current in a normal state and the current during the loss of synchronization according to the example 5.

With the use of the characteristics of FIGS. 14, 15, and 16, the loss of synchronization can be detected according to a flowchart of FIG. 17.

FIG. 17 is a control flow of synchronization loss detection with the use of the difference between the load current in the normal state and the current in the synchronization loss state. Referring to FIG. 17, after the operation starts in Step 101, the selection confirmation of the synchronization loss determination function is performed in Step 102, and the square reduction load, the constant torque load, and the constant output load are determined in the selection discrimination of the load characteristic preset in Step 201. Next, a speed (rotational speed, frequency) HzC at which the current in the synchronization loss and the load current in the normal state become equal to each other is determined according to the determined load characteristic in Steps 202, 203, and 204.

In the case of a square reduction load in Step 202, for example, in the case of the pump or the like, the HzC can be set to a constant value after the opening degree of the valve or the like has been decided. Alternatively, the HzC may be measured according to the actual measurement of the rotational speed and the current during acceleration after the operation has started, and stored.

In the case of the constant torque load in Step 203, for example, in the case of a compressor or the like, since the HzC is determined according to a pressure, a constant value of the HzC at a specific pressure such as a rated pressure is held in advance and the determination is performed only at the specific pressure, thereby being capable of detecting the loss of synchronization. Alternatively, an HzC calculation formula with a pressure as an input variable can be employed. In that case, the loss of synchronization can always be detected according to the HzC at the current pressure.

In the case of a constant output load in Step 204, for example, in the case of a bobbin winding machine or the like, the HzC can be set to a fixed value depending on the yarn type. Alternatively, the HzC may be measured according to the actual measurement of the rotational speed and the current during the acceleration after the operation has started and stored. Thereafter, the loss of synchronization is performed in Steps 251 and 252.

In the case of the square reduction load in Step 251, it is determined that the electric motor is normal if the current rotational speed HzN is larger than the HzC where the load current in the normal state is equal to the load current in the loss of synchronization, and the current load current value AN is larger than the current value in the loss of synchronization in FIG. 14. Conversely, it is determined that the electric motor is out of synchronization if the current rotational speed HzN and the current load current value AN are smaller. In an actual determination, the determination value is given a certain range taking a detection error or the like into consideration.

In the case of the constant torque load and the low output load in Step 252, it is determined that the electric motor is normal if the current rotational speed HzN is larger than the HzC where the load current in the normal state is equal to the load current in the loss of synchronization, and the current load current value AN is smaller than the current values in the loss of synchronization in FIGS. 15 and 16. Conversely, it is determined that the electric motor is out of synchronization if the current rotational speed HzN and the current load current value AN are larger. When it is determined that the electric motor is abnormal, the processing at abnormality in Step 170 is performed.

EXAMPLE 6

Similarly to the example 5, a present example in which a loss of synchronization can be determined when a relationship between a voltage generated by only an induced voltage when an electric motor is out of synchronization and a voltage generated during normal operation is known in advance will be described.

Figure 18:
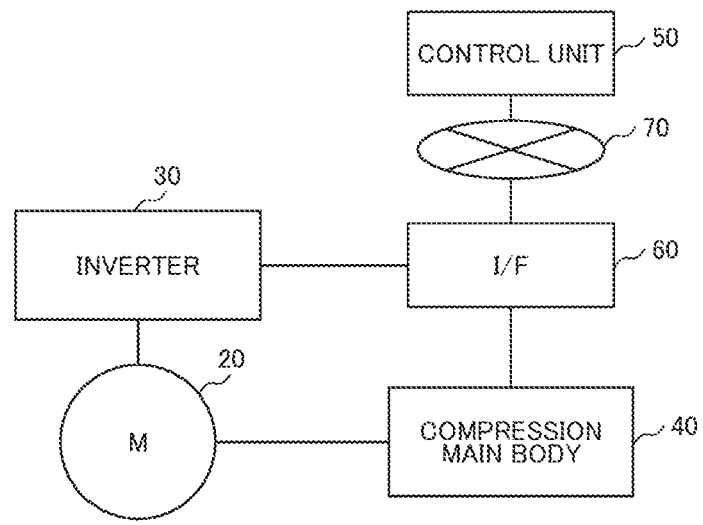
FIG. 18 is a diagram showing an overall configuration of an electric motor system according to an example 6.

FIG. 18 shows an example in which the present invention is applied to a compressor as a specific example of a system configuration. An electric motor 20 is mechanically connected to a compressor body 40 on a load side, and the compressor body 40 obtains a power from the electric motor 20 and compresses an air. An inverter 30 receives a command from a control unit 50 to control the electric motor 20. The control unit 50 receives information from the inverter 30 and information from the compressor body through an I/F 60, and outputs necessary commands to the respective components. As an example of the operation, the control unit 50 receives a value of an air pressure output from the compressor body 40 and compares the received value with an air pressure desired by a user and outputs a value of the frequency for controlling the electric motor 20 to the inverter 30 as a command.

FIG. 18 shows an example in which the I/F 60 is connected to the control unit 50 through a network 70. Alternatively, the I/F 60 and the control unit 50 may be connected to each other through no network. In addition, the control unit 50 may be connected to the compressor body 40 and the inverter 30 directly through no I/F 60.

Figure 19:
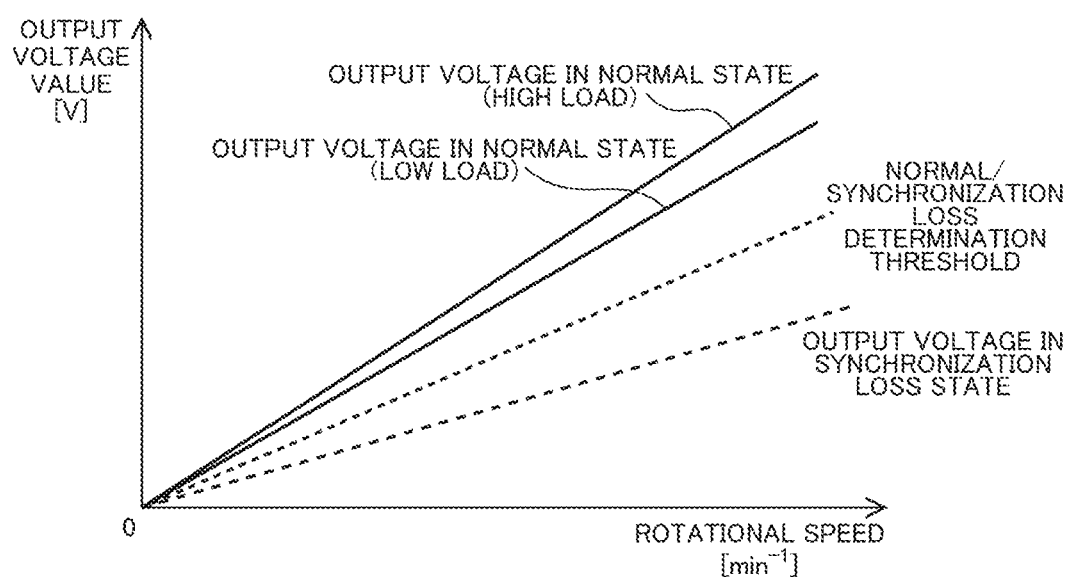
FIG. 19 is an illustrative view of a relationship between a voltage in a normal state and a voltage during a loss of synchronization according to an example 6.

FIG. 19 shows a relationship between a normal voltage and a synchronization loss voltage of a load voltage (output voltage). In the normal state, a voltage value at the time of a high load is generally becomes larger than that at the time of a low load depending on the load state, and the normal voltage is distributed in proportion to the rotational speed with a constant range depending on the load state. In addition, in the synchronization loss state, a torque current and a no-load current cannot be normally detected, and the output voltage is lower than that the normal voltage.

Referring to FIG. 2, a detection unit (not shown) detects the output current and transmits the detected output current value to the arithmetic processing unit 34. The arithmetic processing unit 34 calculates the output voltage value based on the output current value. With the user of the output voltage value and the characteristic illustrated in FIG. 19, a threshold voltage is set between a voltage distribution in the normal state and the voltage in the synchronization loss state in proportional to the rotational speed, thereby being capable of determining whether the electric motor is out of synchronization or not.

Figure 20:
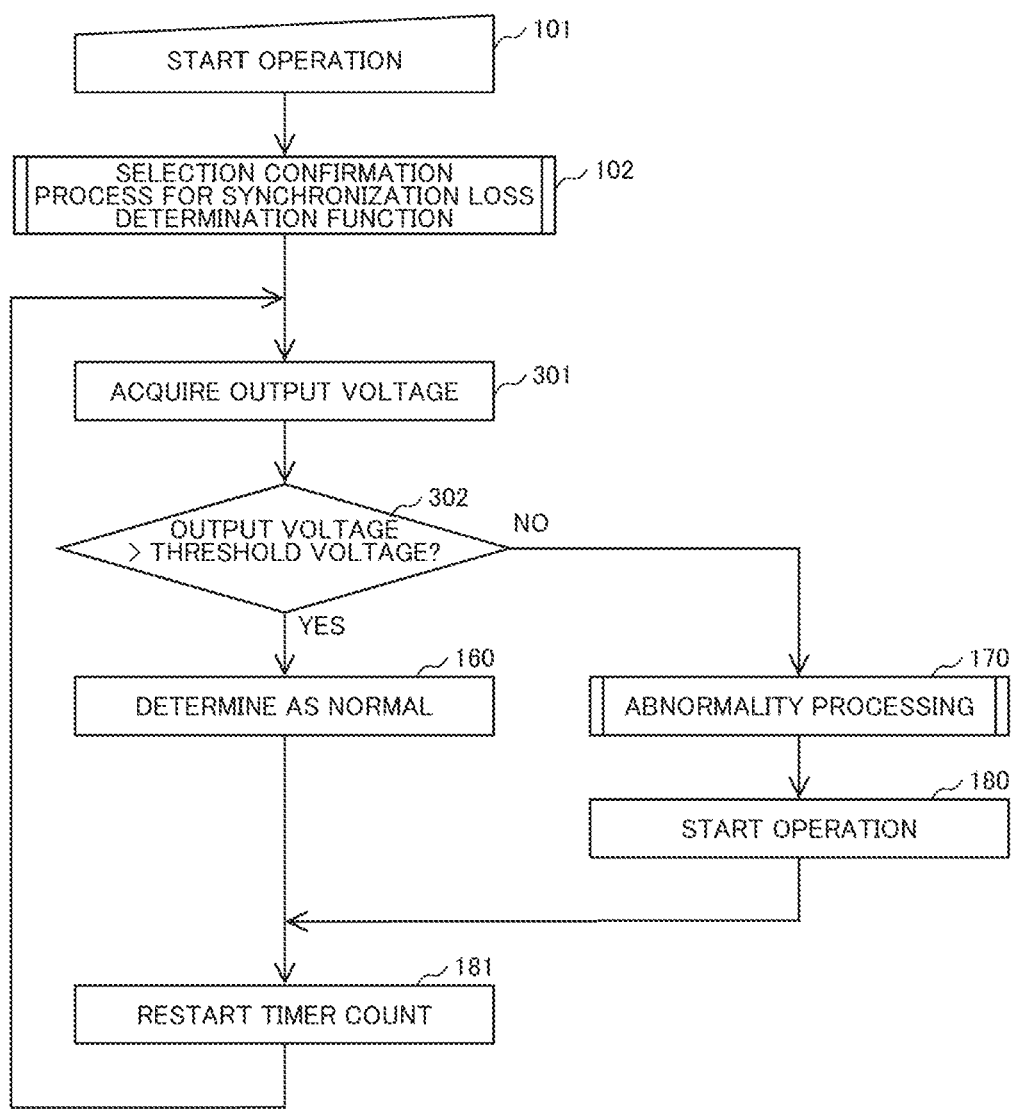
FIG. 20 is a flowchart of a control flow of synchronization loss detection according to an example 6.

FIG. 20 shows a flow of processing when the synchronization loss detection is carried out. After the inverter starts operation of the electric motor (S101), the arithmetic processing unit determines whether or not the output voltage value is equal to or more than the threshold. The arithmetic processing unit determines that the electric motor is in the synchronization loss state and performs the abnormality processing if the output voltage value is less than the threshold. The arithmetic processing unit determines that the electric motor is normal and continues the operation if the output voltage value is equal to or more than the threshold.

As an example of the abnormality process, it is conceivable to transmit a signal indicating that the electric motor is out of synchronization from the inverter 30 to the control unit. Alternatively, after transmission of the signal indicating that the electric motor is out of synchronization, a command for recovery from the loss of synchronization may be received from the control unit, and a control for stopping the operation of the electric motor or restarting the operation of the electric motor after stoppage may be implemented based on the command. In addition, after receiving the signal indicating that the electric motor is out of synchronization, the control unit may display an icon indicating the loss of synchronization on the outside display and alert the user.

Since the output voltage distribution in the normal state differs depending on the electric motor constant and a range of the application load, it is desirable that the output voltage at the time of a high load and the output voltage at the time of a low load in the normal state are actually measured in that application to determine a threshold for the synchronization loss determination in proportion to the rotational speed.

In the examples described above, the synchronization loss detection method based on the DC voltage, the synchronization loss detection method based on the difference between the normal load current and the synchronization loss current, and the synchronization loss detection method based on the difference between the normal load voltage and the synchronization loss voltage have been described. Alternatively, those methods can be used in combination.

The examples have been described above, but the present invention is not limited to the examples described above, and includes various types of modifications. For example, the above examples have been described in detail for the purpose of clarifying the present invention, and the present invention is not always limited to the provision of all of the configurations described above. In addition, a part of one example configuration can be replaced with another example configuration, and the configuration of one example can be added with the configuration of another example.

REFERENCE SIGNS LIST

10: pump, 20: electric motor, 30: inverter, 11: pressure detection unit, 31: an AC-DC conversion unit, 32: DC-AC conversion unit, 33: signal input unit, 34: arithmetic processing unit, 35: storage unit, 40: compressor body, 50: control unit, 60: I/F, and 70: network

The invention claimed is:

1. An electric motor system, comprising:
a synchronous electric motor; and
a power conversion device which drives the synchronous electric motor,
wherein the power conversion device determines whether the synchronous electric motor is out of synchronization or not based on a change amount of a DC voltage value or an output current value inside the power conversion device when a rotational speed of the synchronous electric motor is changed by a predetermined amount to return to an original value during operation of the synchronous electric motor.

2. The electric motor system according to claim 1,
wherein the power conversion device changes a rotational speed during operation of the synchronous electric motor and determines that the synchronous electric motor is out of synchronization when the change amount of the DC voltage is a predetermined value or less.

3. The electric motor system according to claim 2,
wherein the change amount in the rotational speed by which the power conversion device changes is equal to or more than a predetermined value.

4. The electric motor system according to claim 1,
wherein the power conversion device changes the rotational speed during the operation of the synchronous electric motor and determines that the synchronous electric motor is out of synchronization when the change amount of the output current value exceeds a predetermined value.

5. The electric motor system according to claim 4,
wherein the change amount in the rotational speed changed by the power conversion device is equal to or more than a predetermined value.

6. An electric motor system, comprising:
a synchronous electric motor; and
a power conversion device that drives the synchronous electric motor,
wherein the power conversion device determines that the synchronous electric motor is out of synchronization when the power conversion device receives an indication that an output voltage value of the synchronous electric motor is less than a threshold, and
the threshold changes according to the rotational speed.

7. The electric motor system according to claim 6,
wherein the threshold is proportional to the rotational speed.

8. The electric motor system according to claim 7,
wherein the power conversion device stops the synchronous electric motor when the power conversion device determines that the synchronous electric motor is out of synchronization.

9. The electric motor system according to claim 6,
further comprising a communication I/F that communicates with the outside,
wherein the power conversion device outputs a signal indicating that the synchronous electric motor is out of synchronization to the outside when the power conversion device determines that the synchronous electric motor is out of synchronization.

* * * * *